(12) United States Patent
Eaton

(10) Patent No.: US 7,525,276 B2
(45) Date of Patent: Apr. 28, 2009

(54) VEHICLE HAVING AN ARTICULATOR

(75) Inventor: Homer Eaton, Carlsbad, CA (US)

(73) Assignee: Romer, Inc., Carlsbad, CA (US)

( * ) Notice: Subject to any disclaimer, the term of this patent is extended or adjusted under 35 U.S.C. 154(b) by 192 days.

(21) Appl. No.: 11/531,556

(22) Filed: Sep. 13, 2006

(65) Prior Publication Data

US 2007/0063500 A1 Mar. 22, 2007

Related U.S. Application Data

(60) Provisional application No. 60/716,819, filed on Sep. 13, 2005.

(51) Int. Cl.
*G05D 1/00* (2006.01)

(52) U.S. Cl. .................. 318/581; 318/587; 318/568.12; 280/763.1

(58) Field of Classification Search .................. 318/587, 318/581, 568.12; 280/763.1, 69.5; 700/195, 700/218; 701/24
See application file for complete search history.

(56) References Cited

U.S. PATENT DOCUMENTS

| | | | |
|---|---|---|---|
| 2,076,446 A | 4/1937 | Carwardine | |
| 2,787,434 A | 4/1957 | Jacobsen | |
| 3,547,284 A | 12/1970 | Dunbar | |
| 3,713,453 A | 1/1973 | Chiaro et al. | |
| 3,757,190 A | 9/1973 | Shelley | |
| 3,944,798 A | 3/1976 | Eaton | |
| 4,016,830 A | 4/1977 | Sexstone | |
| 4,119,212 A | 10/1978 | Flemming | |
| 4,160,536 A | 7/1979 | Krogsrud | |
| 4,313,263 A | 2/1982 | McMurtry | |
| 4,326,155 A | 4/1982 | Griebeler | |
| 4,382,215 A | 5/1983 | Barlow et al. | |
| 4,388,758 A | 6/1983 | Ernst et al. | |
| 4,459,526 A | 7/1984 | Griebeler | |
| 4,496,279 A | 1/1985 | Langer | |
| 4,593,470 A | 6/1986 | Davies | |
| 4,606,696 A | 8/1986 | Slocum | |
| 4,631,404 A | 12/1986 | Burkhardt et al. | |
| 4,667,096 A | 5/1987 | Dangschat | |
| 4,676,002 A | 6/1987 | Slocum | |
| 4,698,775 A * | 10/1987 | Koch et al. ................. | 700/218 |
| 4,703,443 A | 10/1987 | Moriyasu | |
| 4,718,023 A | 1/1988 | Arora | |
| 4,751,868 A | 6/1988 | Paynter | |
| 4,779,203 A * | 10/1988 | McClure et al. .............. | 701/24 |
| 4,839,646 A | 6/1989 | Tyson | |
| 4,857,926 A | 8/1989 | Neglia et al. | |

(Continued)

FOREIGN PATENT DOCUMENTS

DE 10112977 11/2002

(Continued)

*Primary Examiner*—Paul Ip
(74) *Attorney, Agent, or Firm*—Knobbe, Martens, Olson & Bear LLP

(57) ABSTRACT

Systems and methods for a vehicle mounted articulator are described. A vehicle conveniently allows an articulator to be moved to various remote work sites. In one embodiment, the articulator can be mounted on a movable base, thereby increasing the flexibility of use and/or reach of the articulator. Such vehicle-mounted articulators can be subjected to various potentially damaging situations due to motion of the vehicle. Various features that allow safe operation of the vehicle and the articulator are disclosed.

35 Claims, 19 Drawing Sheets

U.S. PATENT DOCUMENTS

| | | | |
|---|---|---|---|
| 4,888,877 A | 12/1989 | Enderle et al. | |
| 4,913,613 A | 4/1990 | Hirschmann | |
| 4,921,393 A | 5/1990 | Andeen et al. | |
| 4,930,972 A * | 6/1990 | Little | 414/549 |
| 4,937,759 A | 6/1990 | Vold | |
| 4,940,925 A * | 7/1990 | Wand et al. | 318/587 |
| 4,953,822 A | 9/1990 | Sharber et al. | |
| 5,079,500 A | 1/1992 | Oswald | |
| 5,084,981 A | 2/1992 | McMurtry et al. | |
| 5,148,377 A | 9/1992 | McDonald | |
| 5,155,423 A | 10/1992 | Karlen et al. | |
| 5,171,124 A * | 12/1992 | Foster | 414/685 |
| 5,174,039 A | 12/1992 | Murai | |
| 5,271,047 A * | 12/1993 | Freneix | 376/260 |
| 5,293,107 A | 3/1994 | Akeel | |
| 5,297,653 A * | 3/1994 | Wurtz et al. | 182/69.5 |
| 5,347,616 A * | 9/1994 | Minami | 700/251 |
| 5,377,913 A * | 1/1995 | Van Der Woude | 239/227 |
| 5,402,582 A | 4/1995 | Raab | |
| 5,528,505 A * | 6/1996 | Granger et al. | 700/195 |
| RE35,669 E * | 11/1997 | Paskey et al. | 280/763.1 |
| 5,796,229 A | 8/1998 | Akeel | |
| 5,813,551 A * | 9/1998 | Abel | 212/278 |
| 5,887,735 A * | 3/1999 | Abel | 212/277 |
| 6,041,274 A | 3/2000 | Onishi et al. | |
| 6,196,586 B1 * | 3/2001 | Messenger | 280/763.1 |
| 6,227,570 B1 * | 5/2001 | Martinez et al. | 280/764.1 |
| 6,428,266 B1 | 8/2002 | Solomon et al. | |
| 6,431,019 B1 | 8/2002 | Greene et al. | |
| 6,648,569 B2 * | 11/2003 | Douglass et al. | 410/46 |
| 6,668,471 B1 * | 12/2003 | Cook et al. | 37/410 |
| 6,819,550 B2 | 11/2004 | Jobs et al. | |
| 6,820,723 B2 * | 11/2004 | Huber | 182/127 |
| 6,866,465 B2 * | 3/2005 | Jester et al. | 414/556 |
| 6,896,230 B2 | 5/2005 | Cvek | |
| 7,042,714 B2 | 5/2006 | Hillman et al. | |
| 7,139,640 B2 * | 11/2006 | Chae et al. | 700/226 |
| 7,144,057 B1 * | 12/2006 | Young et al. | 296/24.3 |
| 7,210,890 B2 * | 5/2007 | Curotto et al. | 414/408 |
| 7,267,020 B2 * | 9/2007 | Wilcox et al. | 73/866.5 |
| 7,291,056 B2 * | 11/2007 | Ohishi et al. | 451/5 |
| 7,300,239 B2 * | 11/2007 | Benedikt | 414/546 |
| 7,363,107 B2 * | 4/2008 | Chae et al. | 700/226 |
| 2001/0024283 A1 | 9/2001 | Granger | |
| 2005/0166413 A1 | 8/2005 | Crampton | |

FOREIGN PATENT DOCUMENTS

| | | |
|---|---|---|
| EP | 0522610 | 1/1993 |
| GB | 2097359 | 11/1982 |
| GB | 0309662 | 4/2003 |
| GB | 0312963 | 6/2003 |
| GB | 0327503 | 11/2003 |
| GB | 0405396 | 3/2004 |
| JP | 401222883 | 9/1989 |
| JP | 404057690 | 2/1992 |
| JP | 2003/175484 | 9/2003 |
| WO | WO 98/08050 | 2/1998 |
| WO | WO 2004/096502 | 11/2004 |

* cited by examiner

VEHICLE HAVING AN ARTICULATOR

PRIORITY CLAIM

This application claims priority benefit of U.S. Provisional Patent Application No. 60/716,819 filed Sep. 13, 2005, titled "Vehicle Having an Articulator," which is incorporated herein by reference in its entirety.

BACKGROUND

1. Field

The present disclosure generally relates to articulated arm coordinate measuring machines, and in particular, to systems and methods for mounting an articulated arm to a mobile platform.

2. Description of the Related Art

A typical coordinate measuring machine (CMM) has an articulating arm that allows positioning of a probe and/or a detector at different points in space. For example, probe can be positioned at various points on a surface of an object, and spatial positions of the probe (and thus the surface of the object) can be determined via the articulating arm's configuration. In another example, a detector on the articulating arm can be used to characterize surface features of an object by projecting and detecting a signal such as light.

Because articulating arms and the end attachments are precision instruments, they are preferably mounted to a substantially stable platform and operated in controlled environment, such that measurements thus obtained are precise. In many situations, this means that objects being measured need to be brought to the articulator/platform assembly. In some situations, however, moving the objects to the articulator may not be practical or desirable.

SUMMARY

At least some of the foregoing needs can be addressed by systems and methods for a vehicle mounted articulator. A vehicle conveniently allows an articulator to be moved to various remote work sites. In one embodiment, the articulator can be mounted on a movable base, thereby increasing the flexibility of use and/or reach of the articulator. Such vehicle-mounted articulators can be subjected to various potentially damaging situations due to motion of the vehicle. Various features that allow safe operation of the vehicle and the articulator are disclosed.

One embodiment of the present disclosure relates to a vehicle that includes a movement mechanism configured to facilitate movement of the vehicle. The vehicle further includes a body coupled to the movement mechanism. The vehicle further includes an articulator mounted to the body so as to allow operation of the articulator from the vehicle.

In one embodiment, the vehicle further includes a substantially self-contained drive system that allows a human operator to drive the vehicle to different locations. In one embodiment, the drive system includes an electrical motor that is powered by one or more on-board batteries. In one embodiment, the one or more on-board batteries also power operation of the articulator.

In one embodiment, the vehicle includes a plurality of wheels to facilitate the movement, with at least one of the plurality of wheels being steerable by the operator.

In one embodiment, the vehicle further includes a plurality of retractable stabilizers, with each capable of being in retracted and deployed positions. The stabilizers are in retracted positions when the vehicle is moving, and in deployed positions when the vehicle is stationary for operation of the articulator.

In one embodiment, the articulator is coupled to the body via a platform, with the articulator being mounted to the platform and the platform being coupled to the body. In one embodiment, the vehicle further includes a platform movement mechanism configured to allow movement of the platform with respect to the frame to increase the range of motion of the articulator during its operation.

In one embodiment, the platform is movable in a translational manner. In one embodiment, the platform movement mechanism includes a mounting plate coupled to one or more rails that provide guidance for a substantially linear motion of the mounting plate relative to the frame. The mounting plate is configured to allow mounting of the articulator thereon. In one embodiment, the translational motion includes a motion of the platform along a longitudinal direction defined by front and rear of the vehicle. In one embodiment, the translational motion includes a motion of the platform along a direction having a vertical component.

In one embodiment, the platform is movable in a rotational manner with respect to the frame.

In one embodiment, the articulator includes a distal end for mounting of an end assembly. In one embodiment, the frame defines an opening that receives at least a portion of the end assembly to provide protection for the end assembly. In one embodiment, the opening is dimensioned so as to allow substantially all of the end assembly to be within a volume defined by the frame. In one embodiment, the vehicle further includes a latching mechanism that secures the distal end or the end assembly to the frame when the articulator is not in use or when the vehicle is in motion.

In one embodiment, the vehicle further includes an interlock system that inhibits or restricts operation of the articulator under one or more selected conditions. In one embodiment, the interlock system disables movement of the vehicle when the articulator is in its deployed configuration. In one embodiment, the interlock system allows only a limited movement of the articulator transitions between its deployed configuration and secured configuration. In one embodiment, the limited movement includes limited speed and direction of the movement to reduce the likelihood of damage to the articulator during transition between the deployed and secured configurations. In one embodiment, the vehicle further includes an override mechanism that allows overriding of at least one of inhibiting or restricting functionality of the interlock system.

In one embodiment, the articulator includes a plurality of arm sections. The movement of each arm section being effectuated by drive cables driven by motors that are positioned proximately to the location where the articulator is mounted to the body, thereby reducing the moment of inertia of the articulator about the mounting location.

Another embodiment of the present disclosure relates to a method for operating articulators. The method includes providing a movement mechanism to a vehicle so as to facilitate movement of the vehicle. The method further includes mounting an articulator on the vehicle such that the articulator can be operated at different locations reachable by movements of the vehicle.

In one embodiment, the movement mechanism includes a substantially self-contained drive system that allows a human operator to drive the vehicle to different locations.

In one embodiment, the method further includes providing a plurality of retractable stabilizers, with each capable of being in retracted and deployed positions. The stabilizers are in retracted positions when the vehicle is moving, and in deployed positions when the vehicle is stationary for operation of the articulator.

In one embodiment, the mounting of the articulator to the vehicle includes mounting the articulator to a platform that is movable relative to the vehicle.

In one embodiment, the platform is movable in a translational manner. In one embodiment, the translational motion includes a motion of the platform along a longitudinal direction defined by front and rear of the vehicle. In one embodiment, the translational motion includes a motion of the platform along a direction having a vertical component.

In one embodiment, the platform is movable in a rotational manner with respect to the frame.

In one embodiment, the method further includes providing a securing assembly that secures the articulator at or near its distal end to reduce likelihood of damage to the articulator during motion of the vehicle.

In one embodiment, the method further includes providing an interlock system that inhibits or restricts operation of the articulator under one or more selected conditions. In one embodiment, the interlock system disables movement of the vehicle when the articulator is in its deployed configuration. In one embodiment, the interlock system allows only a limited movement of the articulator transitions between its deployed configuration and secured configuration. In one embodiment, the limited movement includes limited speed and direction of the movement to reduce the likelihood of damage to the articulator during transition between the deployed and secured configurations. In one embodiment, the method further includes providing an override mechanism that allows overriding of at least one of inhibiting or restricting functionality of the interlock system.

Yet another embodiment of the present disclosure relates to an apparatus that includes a means for providing a movable vehicle, and a means for providing an articulator to the vehicle.

BRIEF DESCRIPTION OF THE DRAWINGS

These and other aspects, advantages, and novel features of the present disclosure will become apparent upon reading the following detailed description and upon reference to the accompanying drawings. In the drawings, similar elements have similar reference numerals.

DETAILED DESCRIPTION OF SOME EMBODIMENTS

Figure 1A:
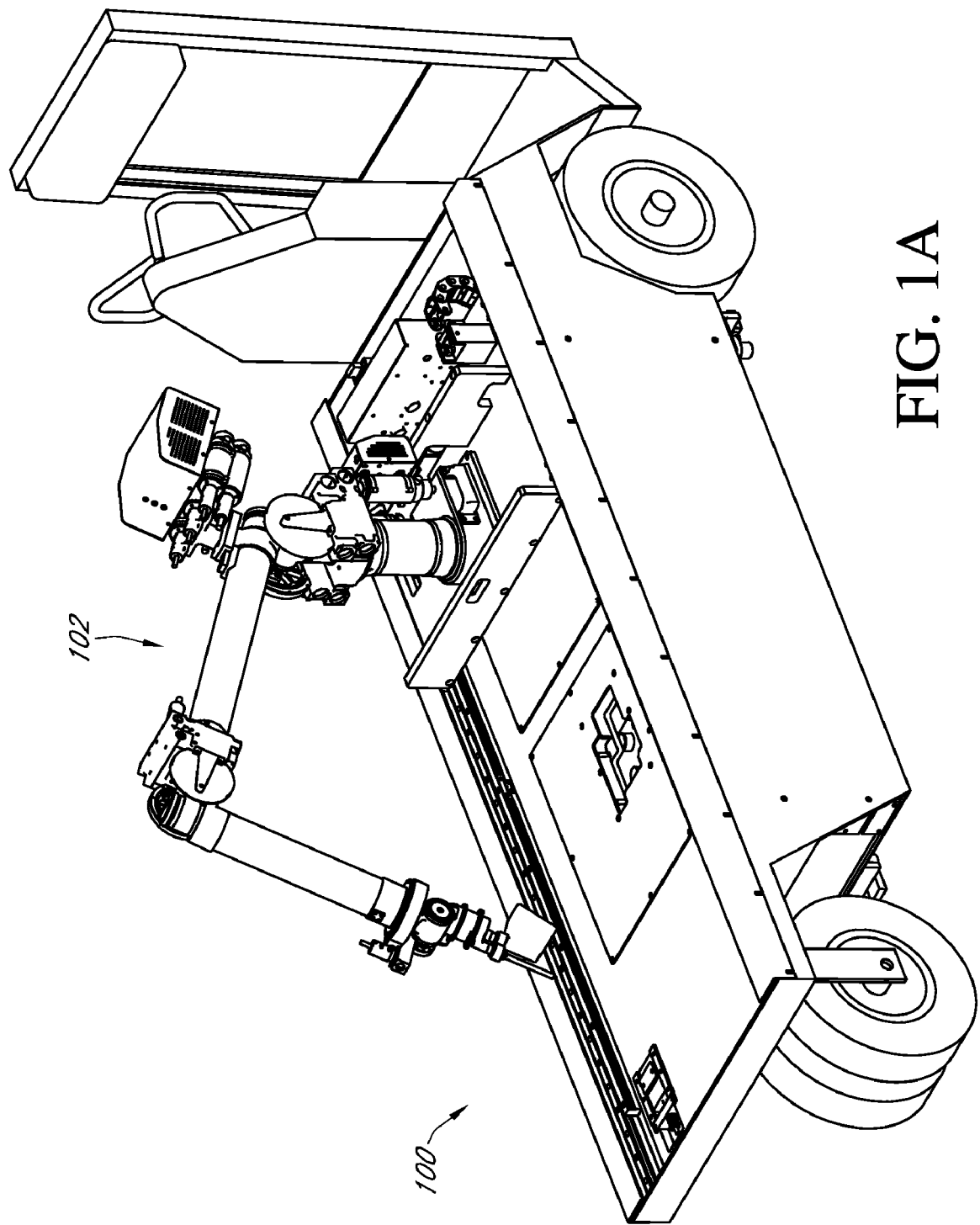
FIGS. 1A and 1B show perspective views of one embodiment of a vehicle having an articulator.
Figure 1B:
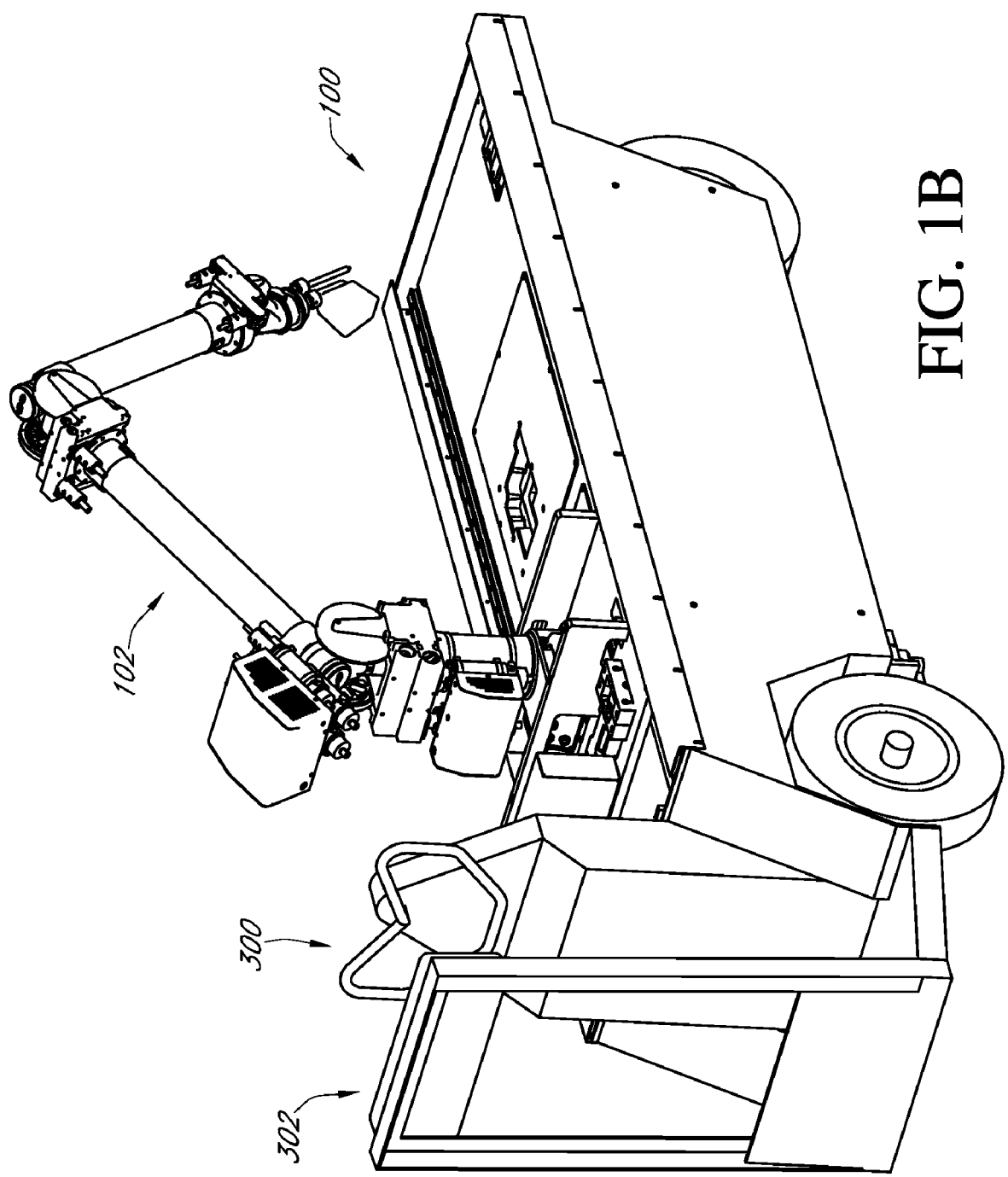

FIGS. 1A and 1B show perspective views of one embodiment of a vehicle 100 having an articulator 102. In one embodiment, the vehicle 100 can be configured to be operated by an operator (not shown). For example, vehicle controlling devices such as a steering device 300 can be provided to allow maneuvering of the vehicle 100 to a desired location. Also, an example provisions such as a backrest 302 can provide a convenient and safety feature for the operator.

In one embodiment, the vehicle 100 has the articulator 102 mounted on it, so that the articulator 102 can be moved to the desired location via the vehicle 100. Various features of the vehicle 100, articulator 102, and/or other components that facilitate the operation of the vehicle and the articulator are described below in greater detail.

In general, although various embodiments of the vehicle 100 is described herein as being a powered vehicle, some of the features of the present disclosure do not necessarily require a powered vehicle.

In one embodiment, the vehicle 100 can include a movement mechanism that facilitates movement of the vehicle. Such movement mechanism can include, by way of examples, a drive mechanism that can provide power to a plurality of wheels. Such drive mechanism and/or wheels can be coupled to a body of the vehicle. For the purpose of description herein, the body of the vehicle can include a frame, a chassis, panels, any structural member, and/or any combination thereof, of the vehicle.

Figure 2A:
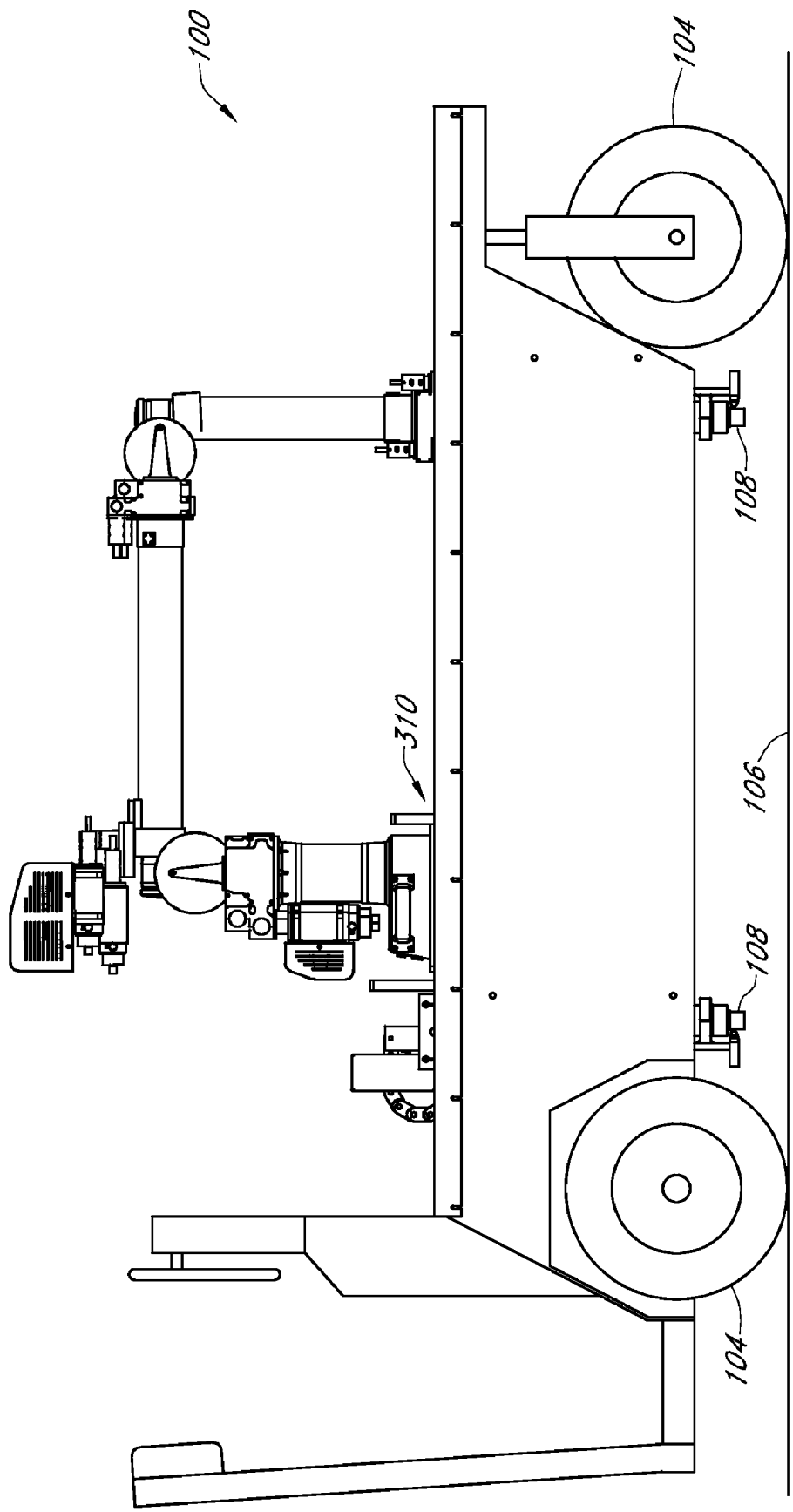
FIG. 2A shows that in one embodiment, the vehicle can include a deployable stabilizer jack system such that when the vehicle is in motion or needs to move, the jacks can be retracted.
Figure 2B:
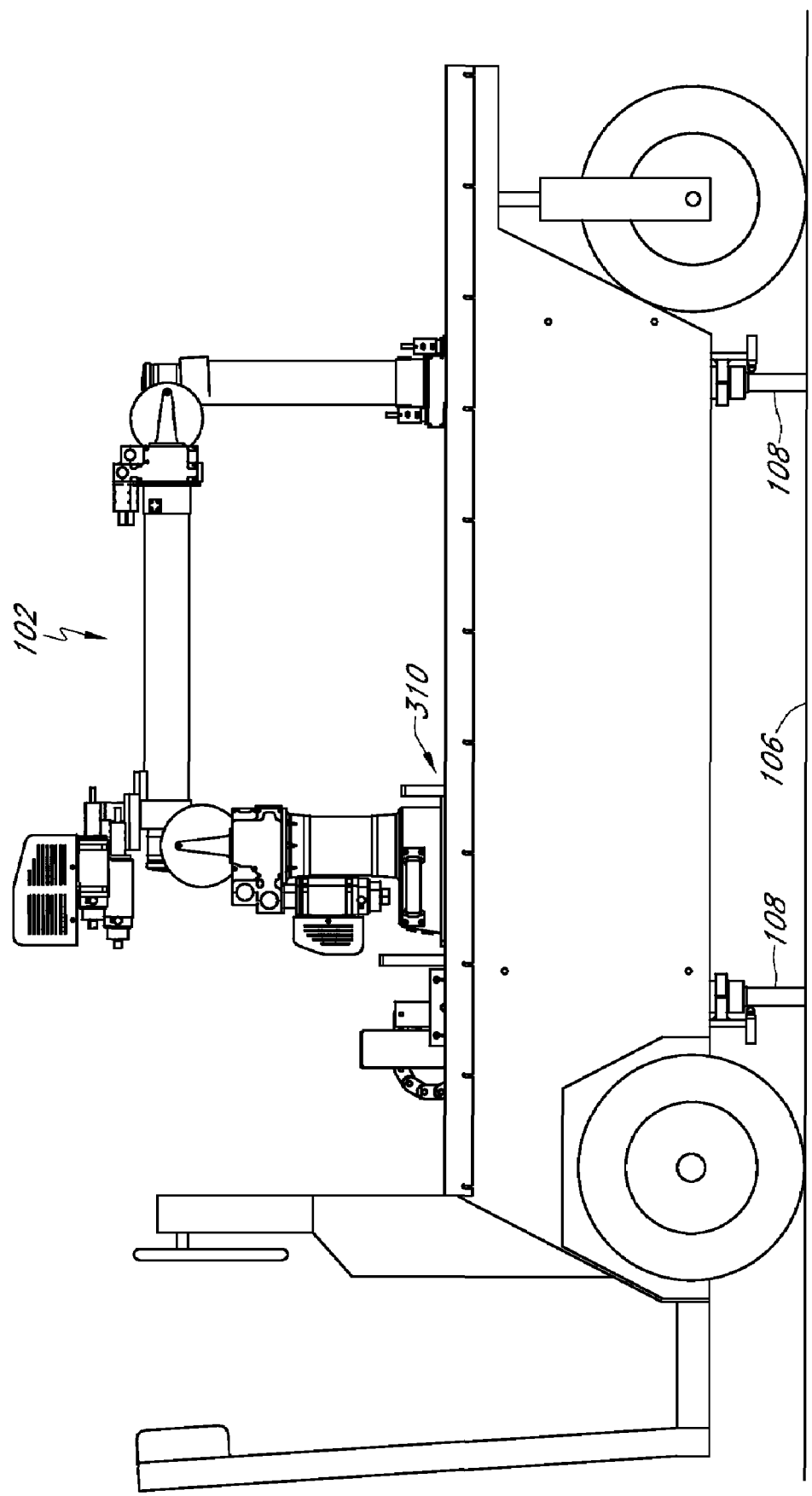
FIG. 2B shows that the jacks can be extended to engage a supporting surface and stabilize the stationary vehicle so as to provide a substantially stable platform for the operation of the articulator.
Figure 2C:
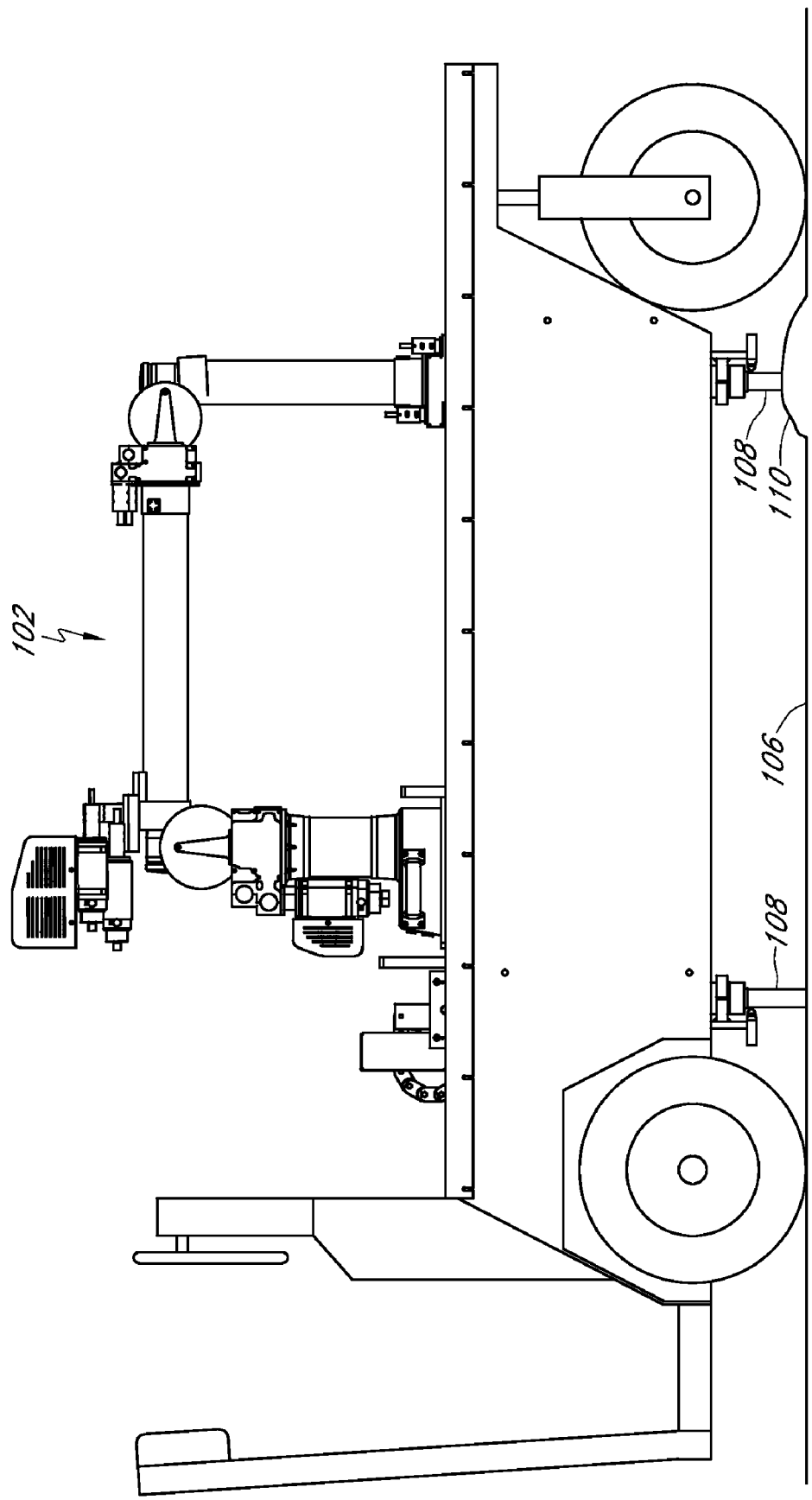
FIG. 2C shows that in one embodiment, the stabilizer jacks can be adjusted to accommodate uneven features on the supporting surface.
Figure 3:
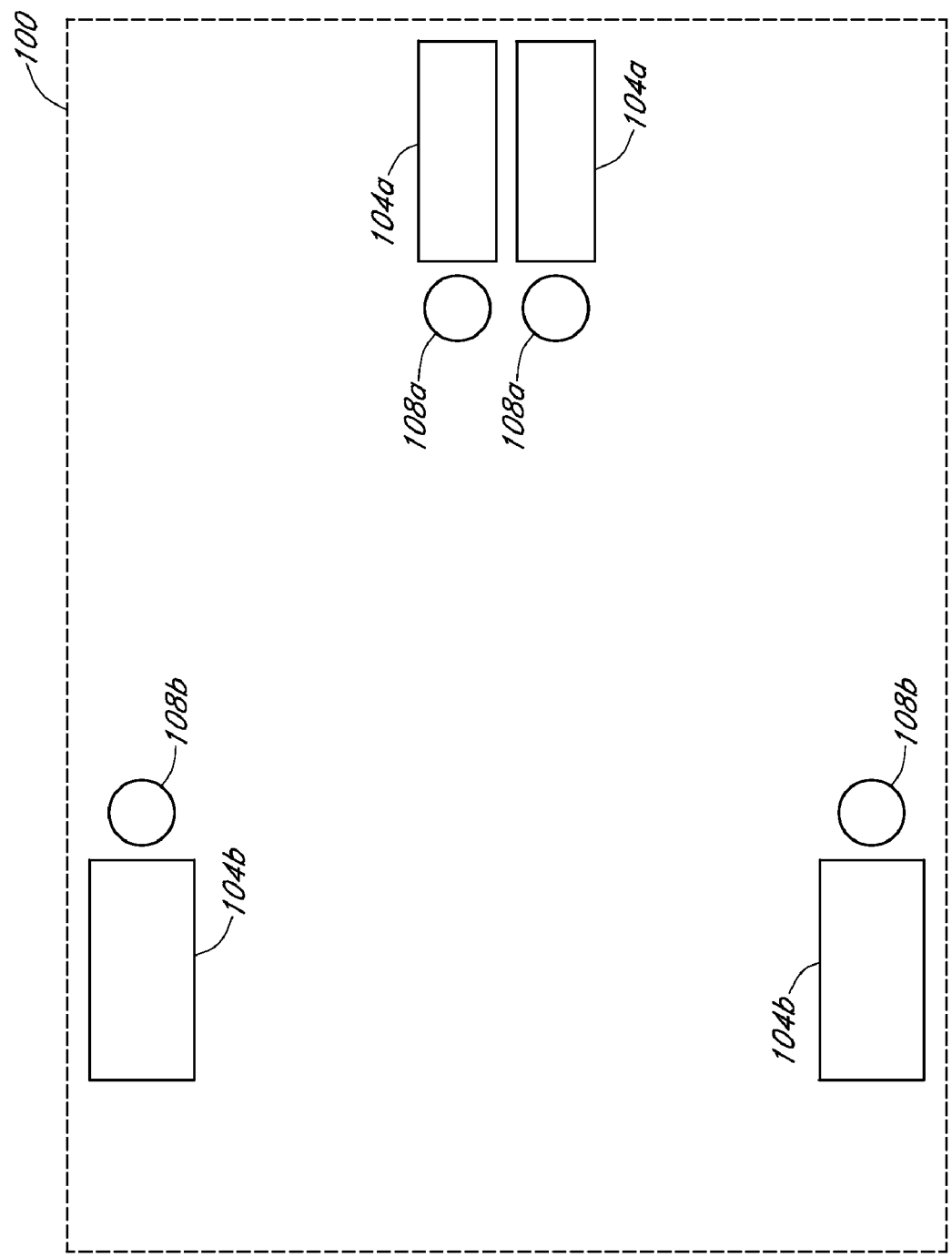
FIG. 3 shows a schematic diagram of one of the many possible arrangements of the stabilizer jacks.

FIGS. 2-3 generally show that in one embodiment, the vehicle 100 can include a stabilizer system that facilitates a substantially stable platform for the articulator when the vehicle 100 is stationary. As shown in one embodiment, as shown in FIG. 2A, one embodiment of the vehicle 100 can include a plurality of wheels 104 that allows rolling motion of the vehicle 100 on a supporting surface 106. In one embodiment, each of the wheels 104 includes a pneumatic tire that provides cushioning effect as the vehicle 100 moves over the surface 106.

In one embodiment, the vehicle 100 may include some form of suspension device and/or leveling device. The suspension can facilitate a smoother motion of the vehicle 100 in motion, and also reduce the amount of motion-related forces on the articulator 102. The leveling device can facilitate positioning the attitude of the vehicle so as to provide a generally level platform for the operation of the articulator 102 (although levelness of the platform is not necessarily a requirement).

While the example tires 104 may provide cushioned ride for the articulator, they may not provide a sufficiently rigid and stable coupling between the surface 106 and a platform 310 to which the articulator is mounted to. Thus in one embodiment, the vehicle 100 can include a plurality of deployable jacks 108 that can be retracted when the vehicle is in motion, and deployed when the articulator is to be operated. FIG. 2A shows the example jacks 108 in their retracted configuration such that the vehicle 100 can move over the surface 106 via the rolling motion of the wheels 104.

FIG. 2B shows the example jacks 108 in their deployed configuration such that the vehicle 100 is stabilized for the operation of the articulator 102. The jacks 108 are shown to engage the surface 106 so as to provide a sufficiently rigid and stable coupling between the surface 106 and the platform 310 for the articulator 102. FIG. 2C shows that in one embodiment, the example jacks 108 can be deployed so as to accommodate various irregular features (such as an example bump 110) on the surface 106.

As one can appreciate, the wheels and/or the stabilizer jacks described above can be configured in any number of ways. FIG. 3 shows one example wheel configuration for the vehicle 100, where the wheels 104 can be arranged in an example tricycle configuration. A front wheel assembly is depicted as including one or more front wheels 104a, and rear wheel assemblies are depicted as including rear wheels 104b. As is generally known, such tricycle configuration can provide a stable support for the vehicle 100 and an easy implementation of steering of the front wheel assembly in a known manner.

In one embodiment as shown in FIG. 3, the stabilizer jacks 108 can also be arranged in a generally triangular pattern. Thus, front jack assembly adjacent the front wheel assembly is shown to include one or more jacks 108a. Similarly, rear jacks 108b are shown to be positioned adjacent the rear wheels 104b.

The stabilizer jacks described in the example embodiments herein can be deployed via any number of mechanisms. For example, the jacks can be actuated manually, electrically, mechanically, hydraulically, any combination thereof, or via any other mechanism. In one embodiment, the jacks 108 are deployed and retracted using hydraulics. When deployed for articulator operation, the jacks extend fully to form "metal-to-metal" coupling, thereby providing a substantially stable coupling between the supporting surface 106 and the platform 310 for the articulator 102.

Figure 4:
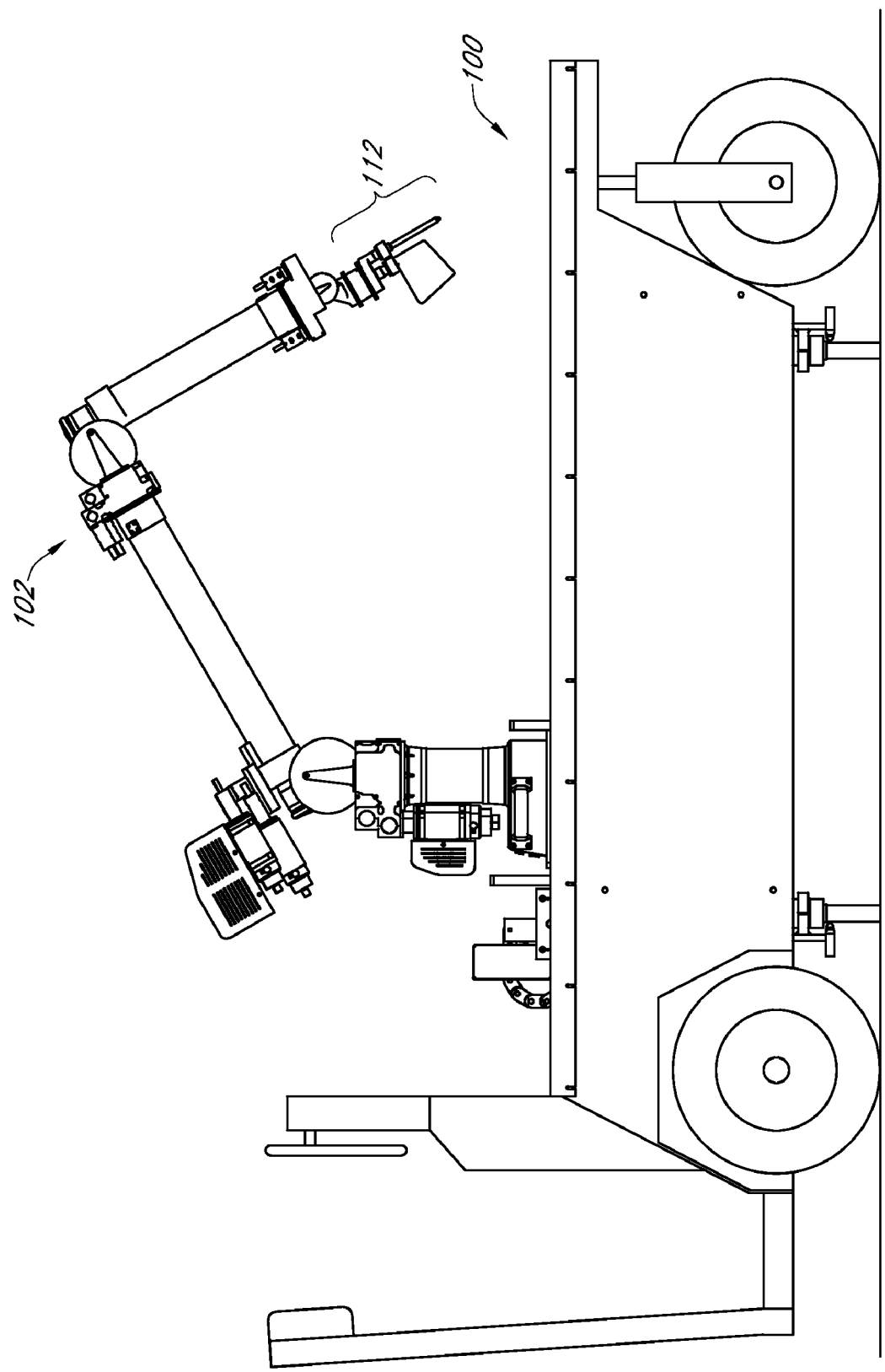
FIG. 4 shows one embodiment of the articulator deployed from the vehicle and ready to perform various operations.

FIG. 4 shows a side view of one embodiment of the vehicle 100 with one embodiment of the articulator 102 deployed. Such a configuration can allow operation of the articulator 102 so as to provide movements and spatial measurements for an end assembly 112. The end assembly 112 can include devices such as a CMM probe, a detector assembly, or any devices that are or can be used in conjunction with articulating arms. One can see from FIG. 4 that the vehicle 100 allows transport of the articulator 102 to a work site, and also provides a substantially stable platform for the operation of the articulator 102.

As shown in the example configuration in FIG. 4, the articulator 102 is shown to be positioned to allow relatively easy accessing of work surfaces (not shown) located at either lateral sides or above the vehicle 100. Because the base of the articulator 102 is positioned near the rear of the vehicle, however, the articulator 102 may have difficulty in positioning the end assembly 112 at locations in front of the vehicle 100.

Figure 5:
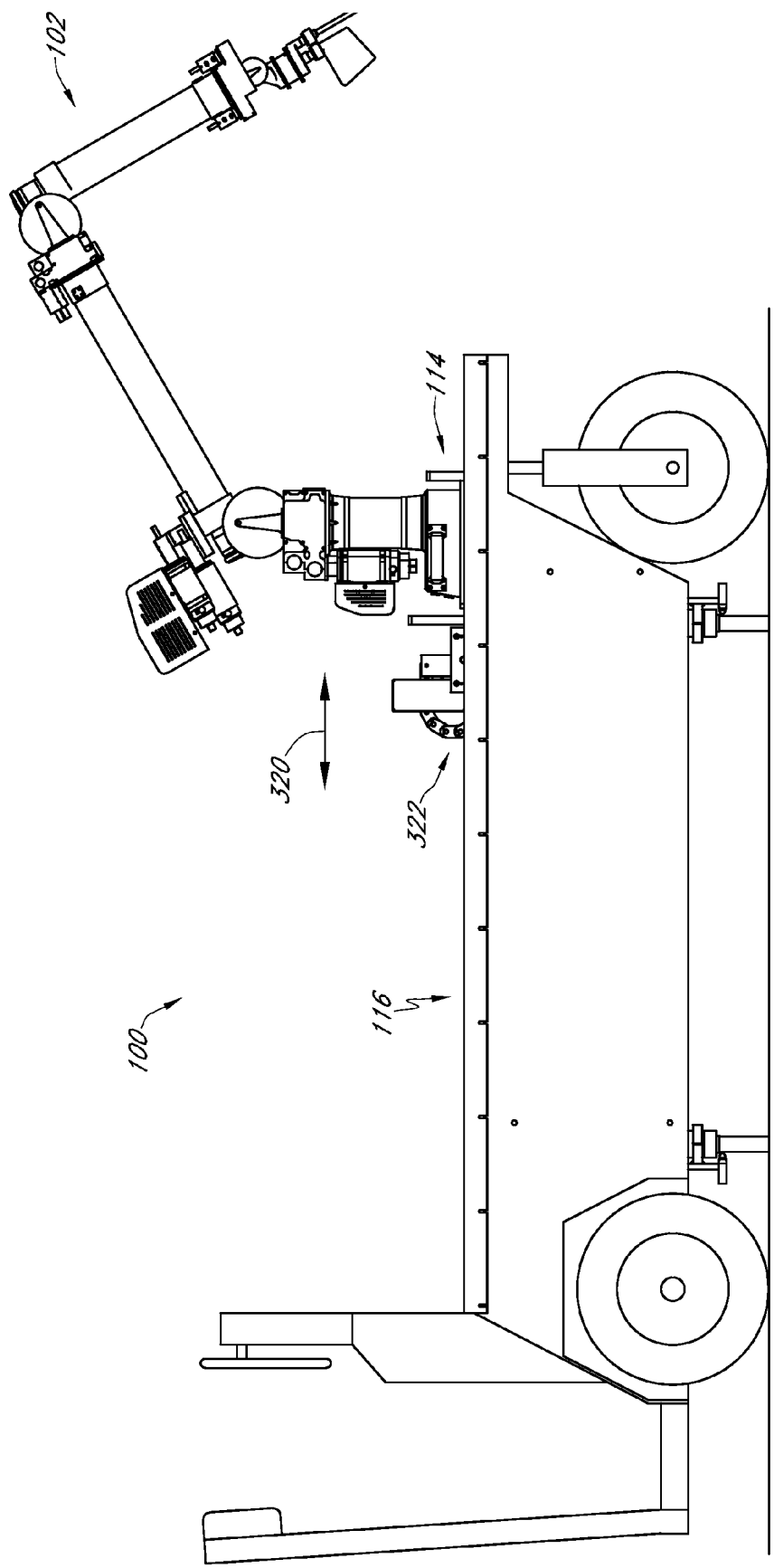
FIG. 5 shows that in one embodiment, the articulator can be mounted on a slidable platform so as to provide flexibility in the manner in which the articulator can be utilized.

FIG. 5 shows that in one embodiment, the vehicle 100 can be configured so that the base 114 of the articulator 102 can be mounted on a movable platform 322 that allows an example longitudinal (front/rear) motion of the articulator 102 as a whole with respect to a stationary platform 116 of the vehicle 100. The longitudinal motion is depicted as an arrow 320. In one embodiment, the movable platform 322 can be driven by any number of ways, including but not limited to, chain drive, belt drive, screw drive, rack and pinion drive, and the like. In one embodiment, the movable platform moves along linear rails that extend longitudinally, and has a total travel of approximately 1.5 m. This example dimension of course depends on the example vehicle. Travel dimensions larger or smaller than this example dimension are also possible.

Figure 6:
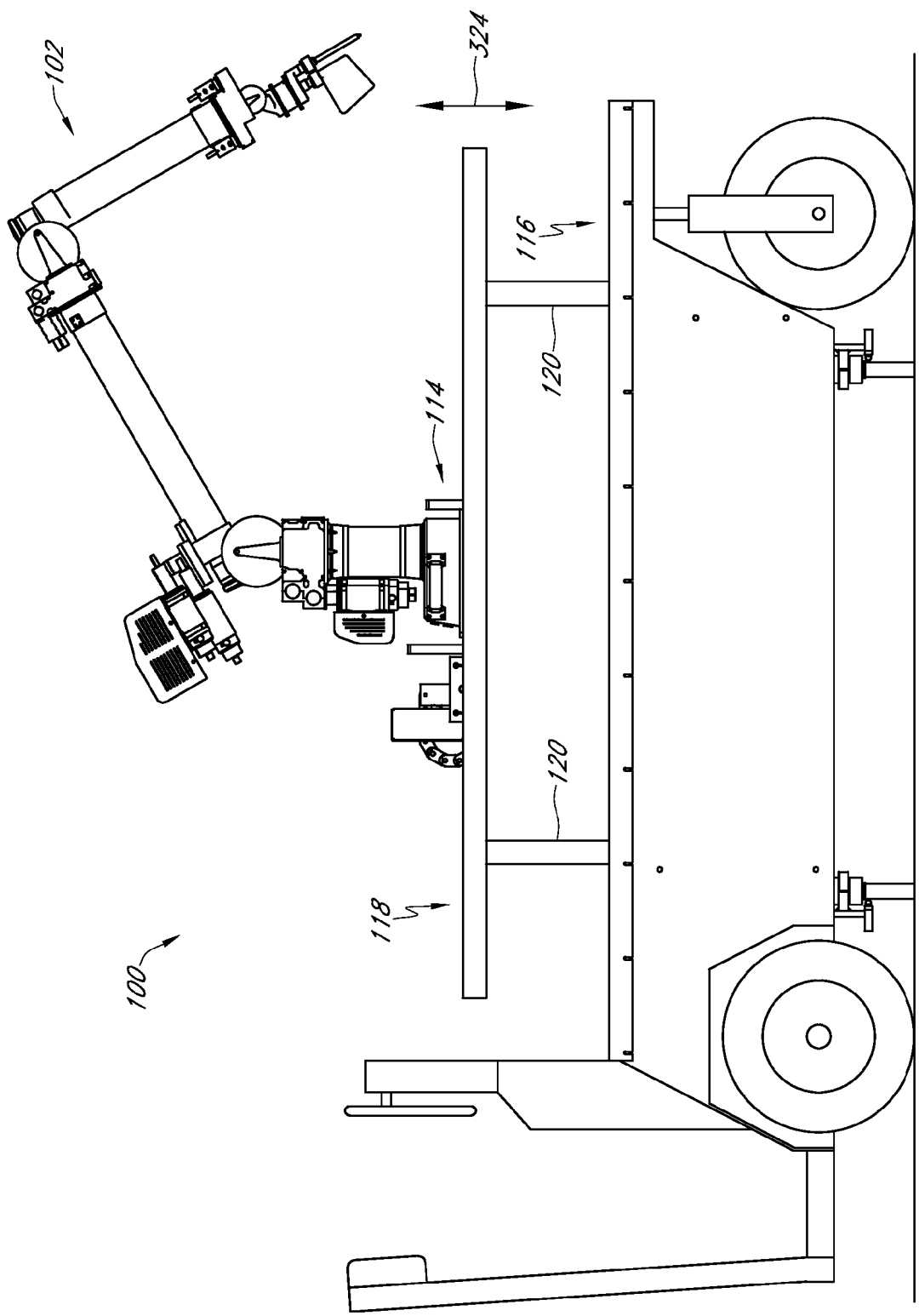
FIG. 6 shows that in one embodiment, the articulator can be mounted on a raisable platform so as to provide flexibility in the manner in which the articulator can be utilized.

FIG. 6 shows that in one embodiment, the vehicle 100 can be configured so that the base 114 of the articulator 102 can be mounted on a movable platform 118 that allows an example vertical motion of the articulator 102 as a whole with respect to the stationary platform 116 of the vehicle 100. The vertical motion of the movable platform 118 is depicted as an arrow 324, and can be achieved by vertical movement members 120. The vertical movement members 120 can include any number of known mechanisms such as manual, electrical, mechanical, hydraulic, and the like.

It will be understood that the movable platforms depicted in FIGS. 5 and 6 are examples only. The vehicle does not need to have a movable platform. On the other hand, other types of movable platforms (for example, tilting, or rotating platforms) can be implemented. Furthermore, in one embodiment, a given movable platform can be configured to allow more than one type of motion relative to the stationary platform. For example, a linear rail system could be mounted on a vertically movable platform, thereby allowing both longitudinal and vertical movements of the articulator as a whole.

Articulators and various end attachments are typically precision instruments in general. Accordingly, they should preferably be treated as such. One of the consequences of having an articulator mounted on a vehicle is that the articulator moves along with the vehicle. Thus, it may be preferable to secure the articulator when the vehicle is moving, so as to prevent the articulator from swinging around uncontrollably and increasing the likelihood of damage. FIGS. 7-10 show various embodiments of an articulator interlock system that can facilitate such securing and operation of the articulator.

Figure 7A:
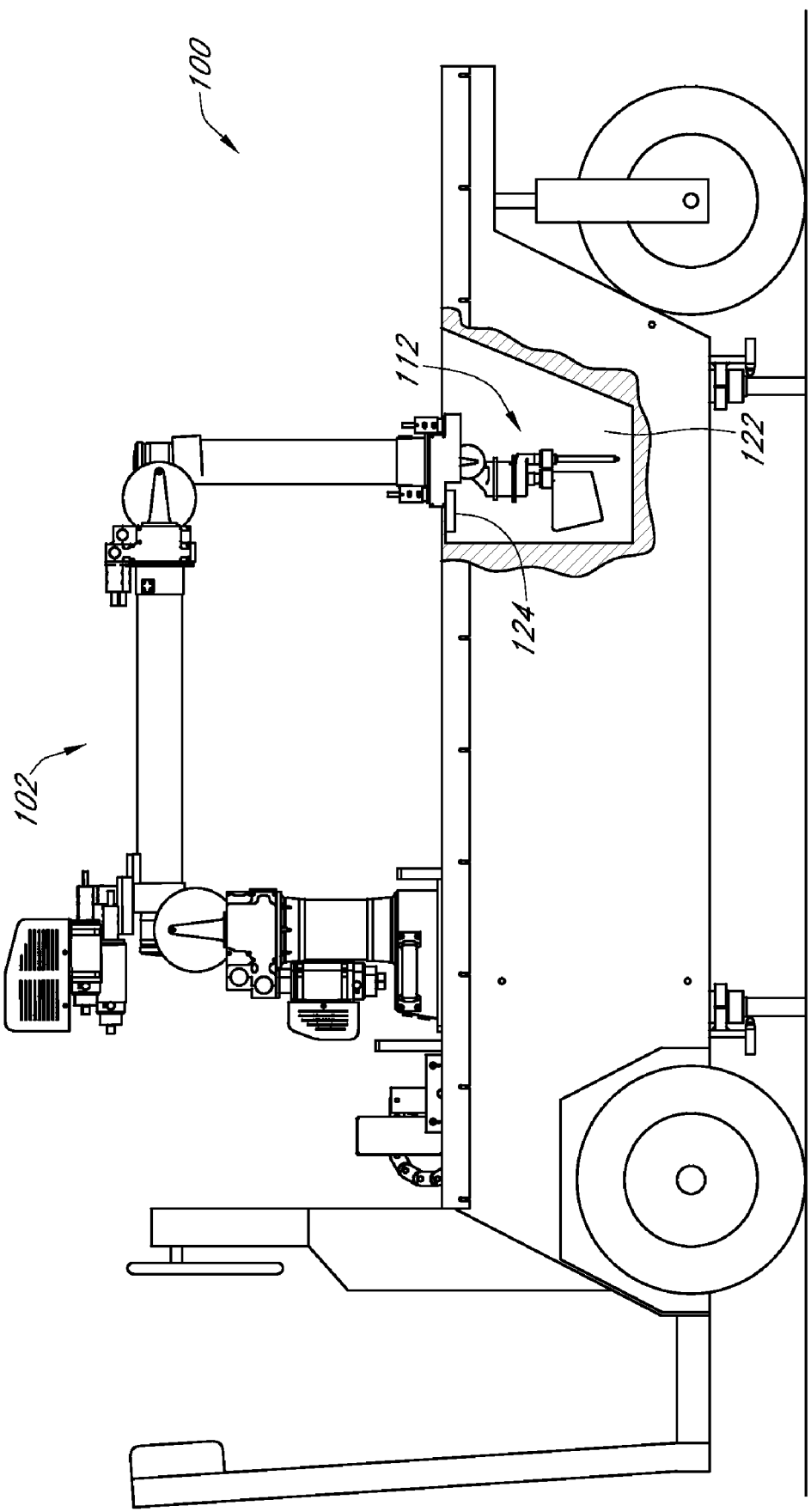
FIGS. 7A-7C show that in one embodiment, the vehicle can include an interlock system that secures and protects the articulator's end attachment when the articulator is not in use.
Figure 7B:
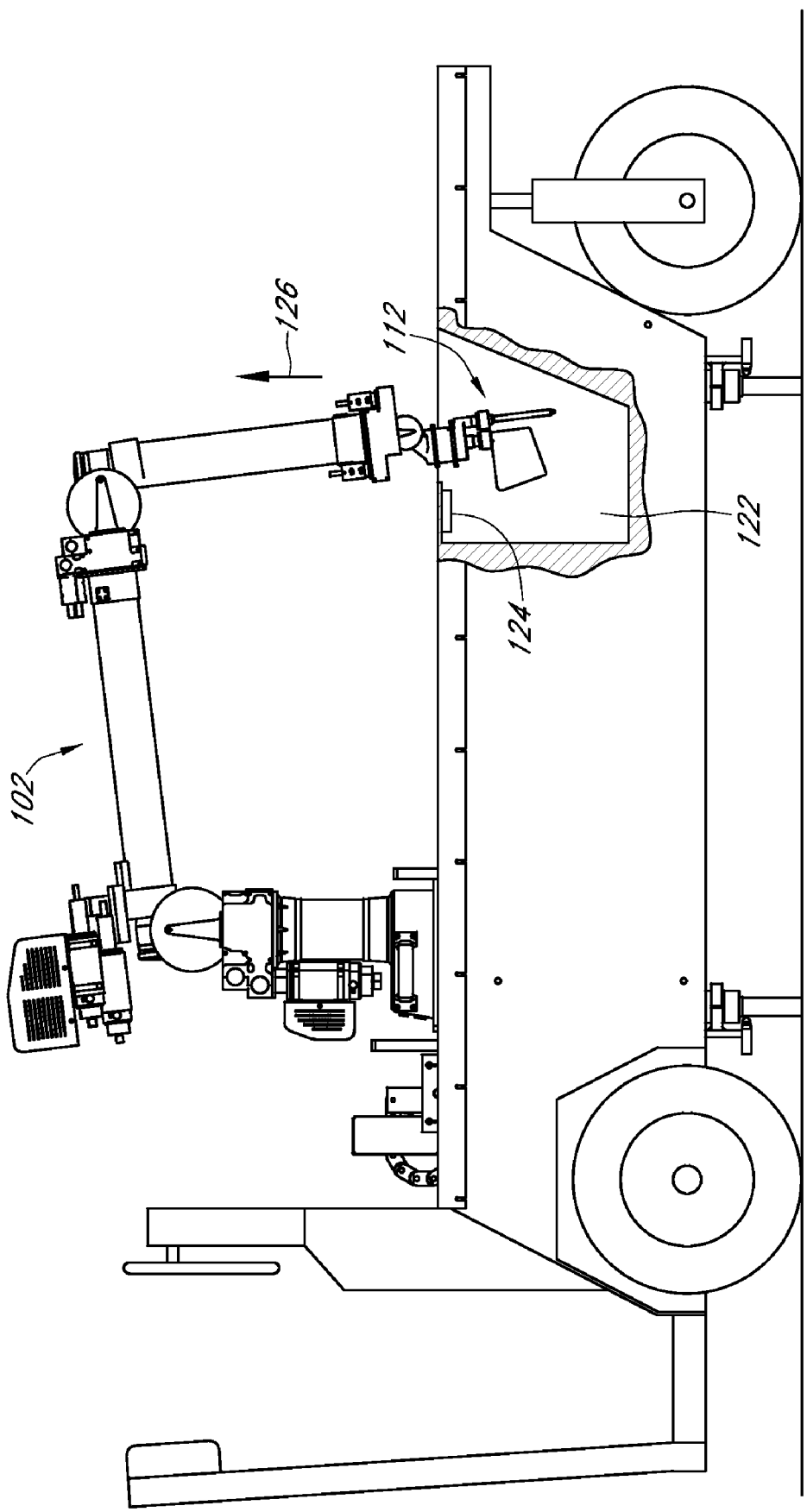
Figure 7C:
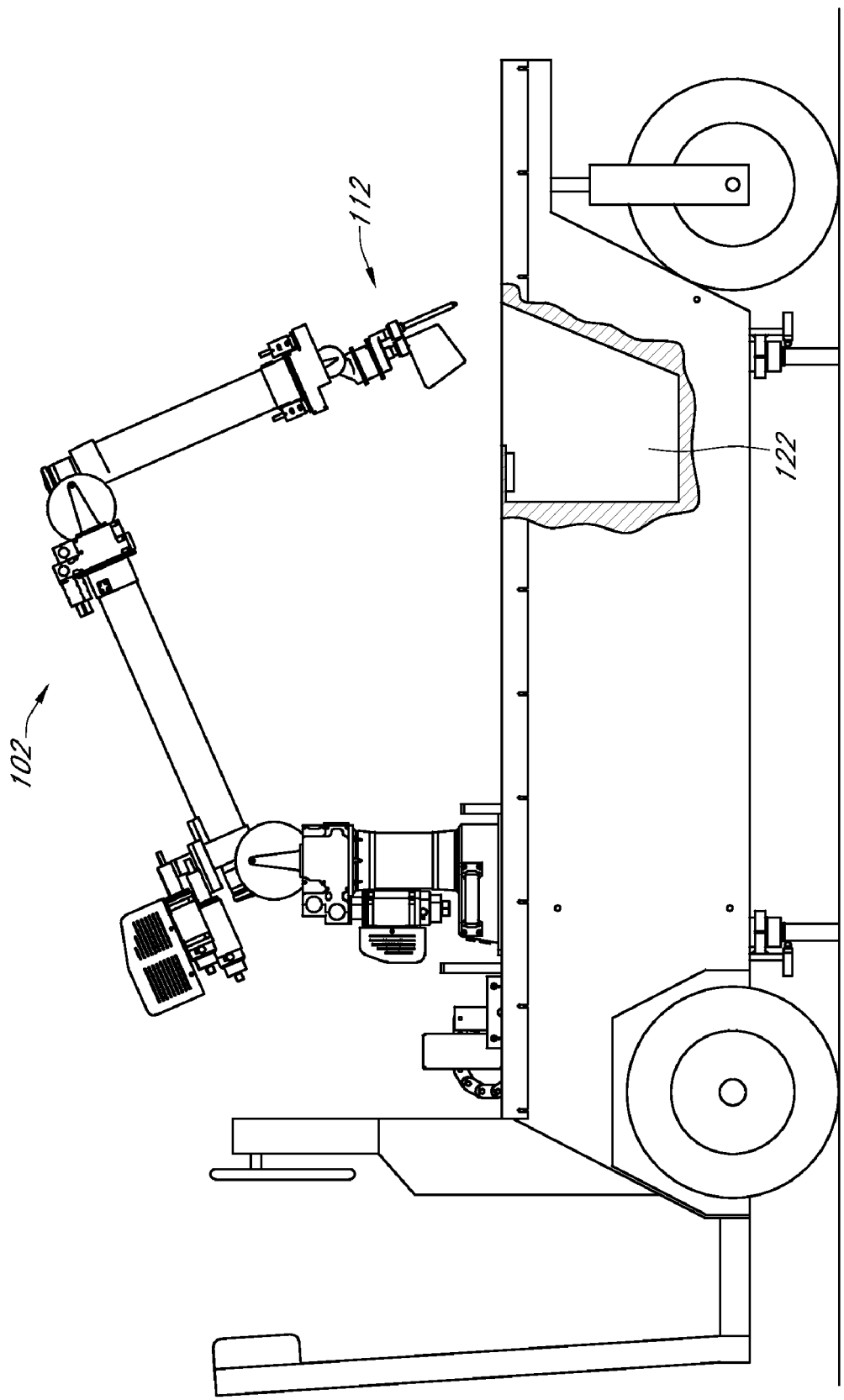

FIGS. 7A-7C show one embodiment of an articulator securing system, with the articulator 102 in various stages of deployment. In FIG. 7A, the example articulator 102 is shown to be in a secure configuration, where the end assembly 112 is positioned in a receiving space 122 defined in the vehicle 100. Although the receiving space 122 is depicted as defined volume, it does not necessarily mean that such walls or enclosure are needed. There may or may not be such defined enclosure structure. Thus for the purpose of description, it will be understood that the receiving space 122 simply represents a volume (enclosed, partially enclosed, or not enclosed) that is dimensioned to allow receiving of the end assembly 112.

The articulator's end adjacent the end assembly 112 is shown to be secured to the vehicle 100 via a latching assembly 124. In such a configuration, the articulator 102 is secured to the vehicle 100 at the base (114 in FIG. 5, for example), and also at the other end (via the latching assembly 124), thereby securing the articulator 102 at two locations. In such a secure configuration, the articulator 102 is less likely to sway or swing when the vehicle 100 moves, thereby reducing the likelihood of damage to various parts of the articulator 102.

In FIG. 7B, the articulator 102 is shown to begin its deployment motion. In one embodiment, such deployment motion can be allowed after the latching assembly 124 releases the end of the articulator 102. As shown, the initial deployment motion is shown to be along a direction having a component along the vertical direction 126. This is because the example articulator's distal section is in the vertical orientation when secured. In general, other configurations are possible. For example is the end assembly 112 and the distal section are secured in an angled orientation, then the initial deployment motion can be along that angled direction.

In one embodiment, lateral motion (in and out of the plane of paper) of the articulator 102 is not permitted when the end assembly 112 has not cleared the receiving space 122. Such restriction on the initial deployment movement inhibits the end assembly 112 from bumping into the walls or edges of the receiving space 122, again reducing the likelihood of damage to the end assembly 112 and possibly the articulator 102.

In FIG. 7C, the articulator 102 is shown to have been deployed where the end assembly 112 has cleared the receiving space 122. Once deployed, the articulator can undergo measurement operations.

Figure 8:
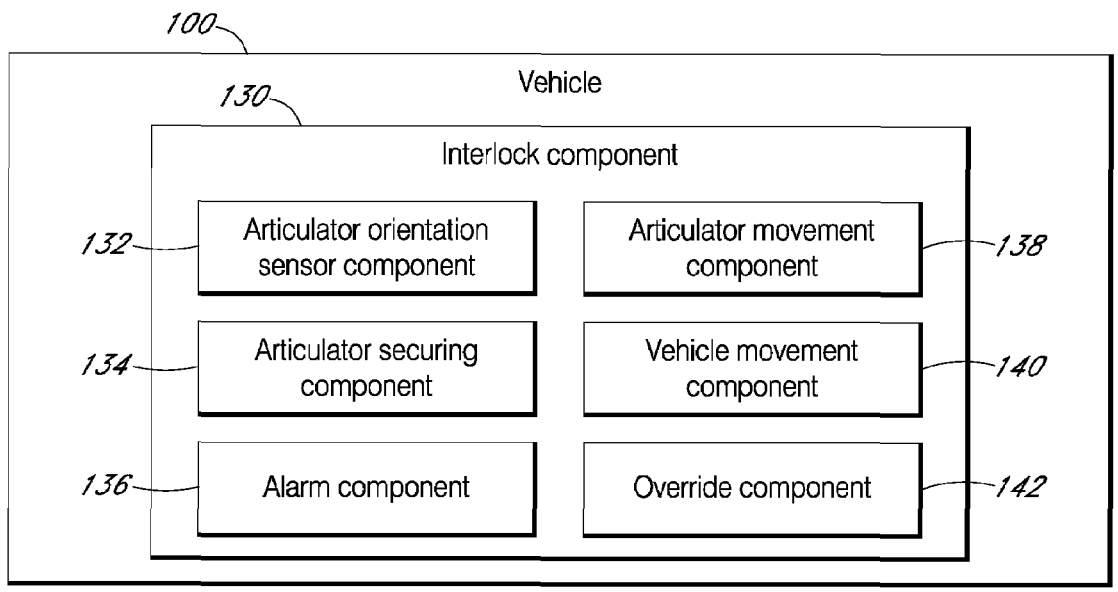
FIG. 8 shows a block diagram of one embodiment of the interlock system.

FIG. 8 shows a block diagram of one embodiment of the vehicle 100 having an interlock component 130 that can be configured to facilitate safe operation of the vehicle 100 and/or the articulator 102. The interlock component 130 can include a component 132 that is configured to sense the orientation of the articulator, an articulator securing component 134, an alarm component 136, an articulator movement component 138, a vehicle movement component 140, and an override component 142.

In one embodiment, the articulator orientation sensor component 132 can be configured to determine the position of the end assembly. Because the operation of the articulator generally relies on knowing where the end assembly is, such position information can be readily obtained in a known manner.

In one embodiment, the articulator securing component 134 can include the latching assembly 124 described above in reference to FIGS. 7A-7C. The latching assembly can include any type of known mechanism that releasably secures one part to another. The securing component 134 can also include an actuating component that releases or secures upon some triggering condition. The securing component 134 can also include a component that senses the state of the latching assembly (i.e., whether or not the articulator is secured by the latching assembly).

In one embodiment, the alarm component 136 can be configured to be triggered when certain conditions are met. An example of how the alarm 136 can be utilized in the interlock component 130 is described below in greater detail.

In one embodiment, articulator movement component 138 can include components that facilitate various movements of the articulator. For example, power supply, servo motor assembly, control system, and the like, can be considered to be part of the articulator movement component 138 for the purpose of describing the example interlock system.

In one embodiment, the vehicle movement component 140 can include components that facilitate various movements of the vehicle. For example, drive system, vehicle control system, and the like, can be considered to be part of the vehicle movement component 138 for the purpose of describing the example interlock system.

In one embodiment, the override component 142 can be configured to allow overriding of certain states of the interlock system. An example of how the override component 142 can be utilized in the interlock component 130 is described below in greater detail.

Figure 9:
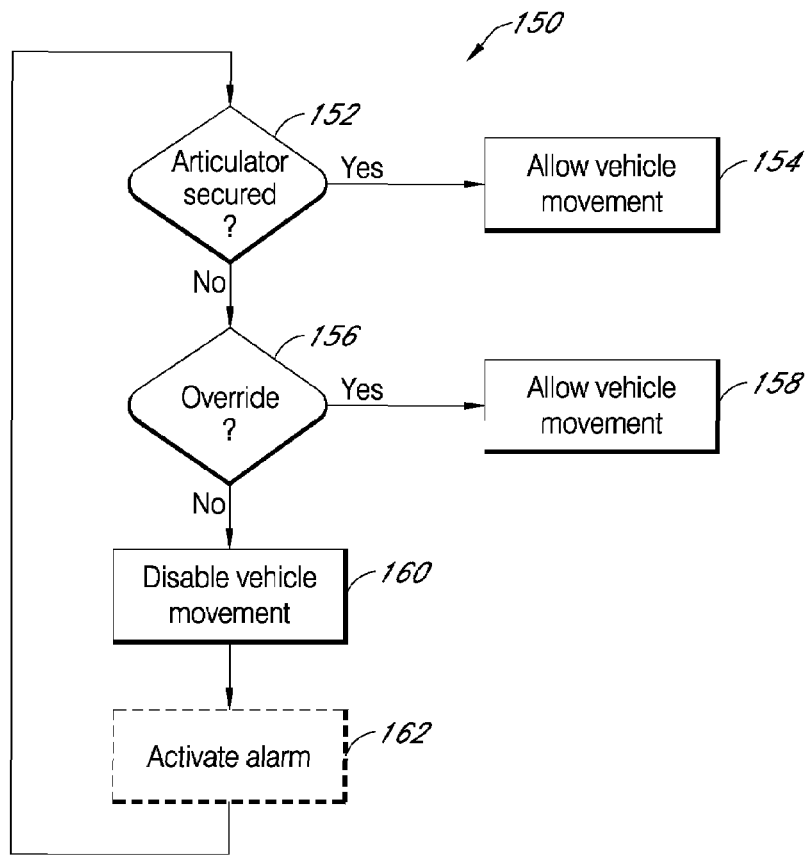
FIG. 9 shows one embodiment of an interlock process that can be implemented by the interlock system.

FIG. 9 shows one embodiment of an example process 150 that can be performed by the interlock system 130 (FIG. 8) to generally inhibit vehicle movement when the articulator is not secured properly. For the purpose of describing the process 150, it will be assumed that the state (orientation, for example) of the articulator is known.

In a decision block 152, the process 150 determines whether the articulator is secured. If the answer is "Yes," the process 150 in a process block 154 allows movement of the vehicle. If the answer is "No," the process 150 then determines in a decision whether an interlock override has been activated. Such an override may be activated by, for example, a simple switch, key switch, code entry, and the like. The override feature may be useful in situations when the vehicle needs to be moved with the articulator in its deployed configuration. In some embodiments, the override feature may not exist, or be optional. In some embodiments, if the vehicle needs to be moved via the override (articulator deployed), allowed vehicle movements may be limited. For example, the maximum speed of the vehicle may be limited at a value lower than the normal operating speed.

If the answer in the decision block 156 is "Yes," the process 150 in a process block 158 allows movement of the vehicle. If the answer is "No," the process 150 in a process block 160 does not allow movement of the vehicle. As further shown in FIG. 9, the process 150 can also activate an alarm in a process block 162. Such an alarm can indicate that the vehicle is attempting to be moved with the articulator unsecured.

Figure 10:
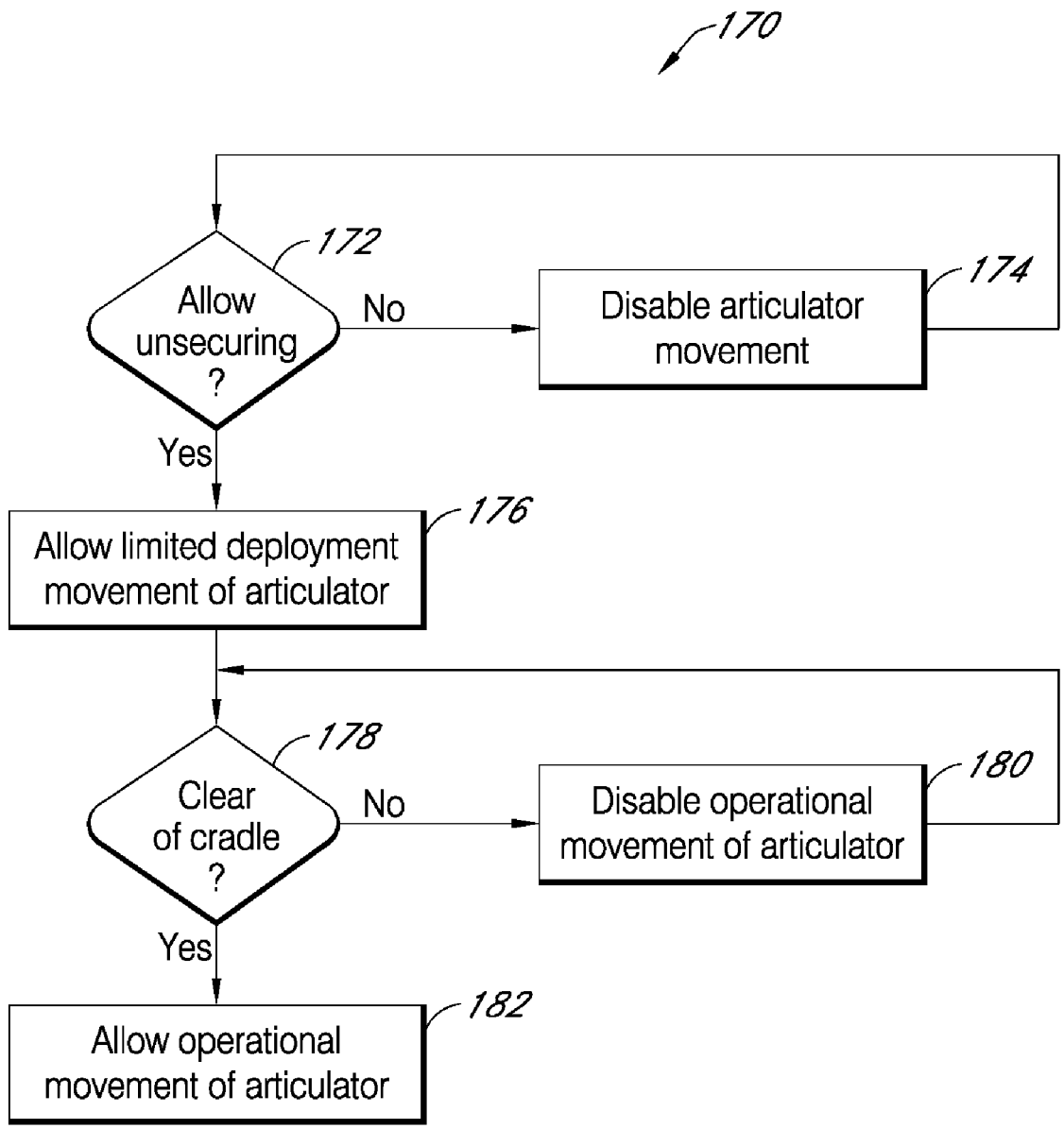
FIG. 10 shows another embodiment of an interlock process that can be implemented by the interlock system.

FIG. 10 shows one embodiment of an example process 170 that can be performed by the interlock system 130 (FIG. 8) to facilitate safe deployment of the articulator. For the purpose of describing the process 170, it will be assumed that the articulator is initially in its secured configuration. In a decision block 172, the process 170 determines whether to allow unsecuring of the articulator. Such determination can be made by considering, for example, whether the vehicle is stationary and stabilized. If the answer in the decision block 172 is "No," the process 170 in a process block 174 disables the articulator movement and/or maintains such a disabled configuration. In one embodiment, the process block 174 maintains such a configuration until a condition for allowing the unsecuring of the articulator is met.

If the answer in the decision block 172 is "Yes," the process 170 in a process block 176 allows a limited deployment movement of the articulator. Such limited deployment movement can include, for example, the vertical movement (and no lateral movement) of the end assembly 112 described above in reference to FIG. 7B.

As the articulator undergoes the limited deployment movement, the process 170 in a decision block 178 determines whether the end assembly has cleared the receiving space. If the answer in "No," the process 170 disables the operational movement of the articulator and maintains the limited deployment movement in a process block 180. If the answer is "Yes," the process 170 in a process block 182 allows the operational movement of the articulator.

Figure 11:
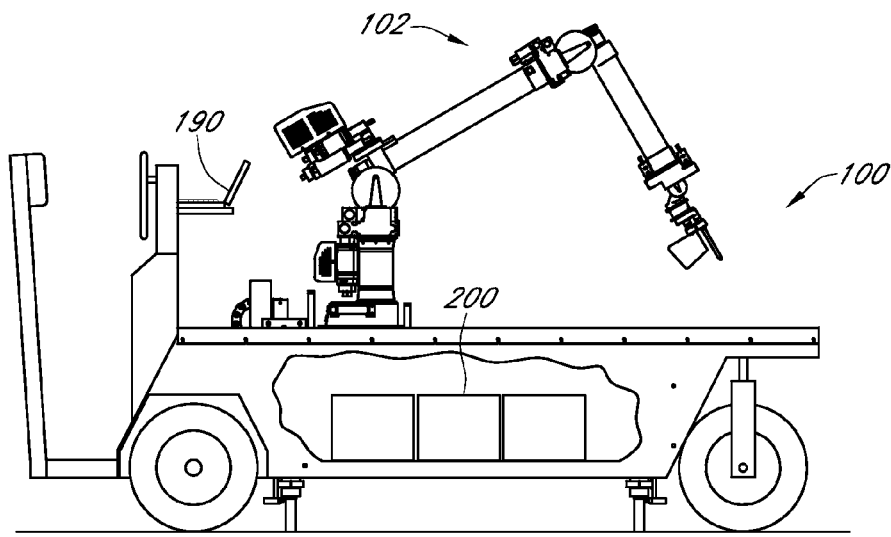
FIG. 11 shows that in one embodiment, the vehicle can include a control system and/or a power supply system that facilitate(s) the operation of the vehicle and/or the articulator.

FIG. 11 shows a partial cutaway view of one embodiment of the vehicle 100 having a control component 190 and a power component 200. In one embodiment, either or both of these components can be configured to facilitate the operation of the articulator 102.

Figure 12:
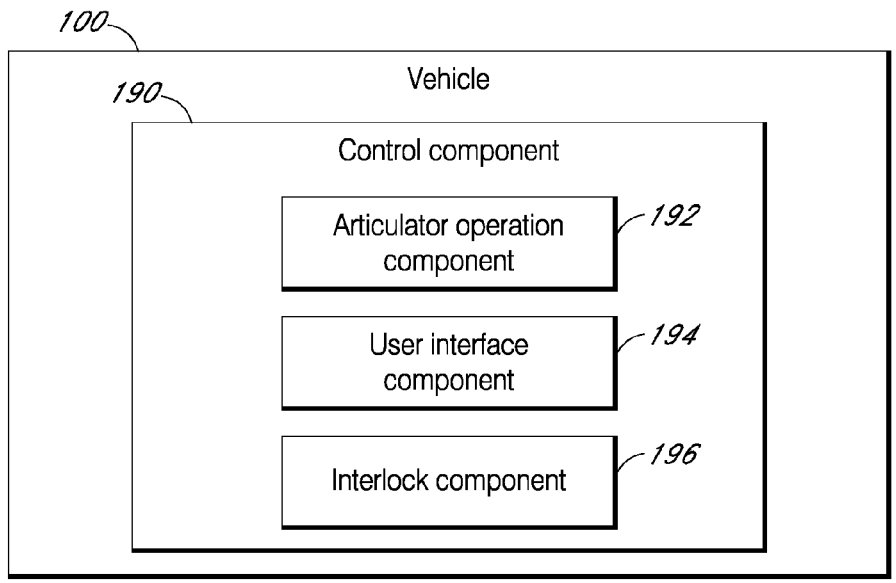
FIG. 12 shows a block diagram of one embodiment of the control system.

As shown in FIG. 12, one embodiment of the control component 190 can include functional components such as an articulator operation control component 192, a user interface component 194, and an interlock control component 196. The articulator operation control component 192 can be configured to perform, for example, various measurement functions of the articulator. The user interface component 194, such as a display screen and an input device, can be configured to facilitate interaction of the control component 190 with the user. The interlock component 196 can be configured to perform, for example, various interlock functions described above in reference to FIGS. 8-10.

Figure 13:
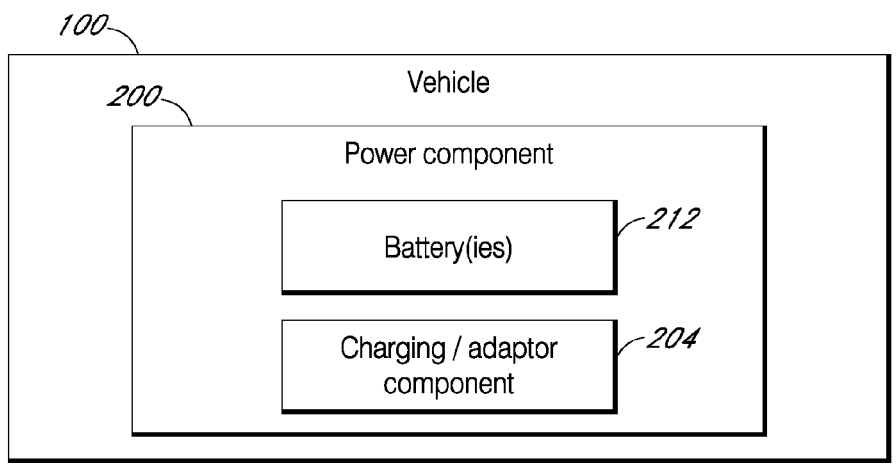
FIG. 13 shows a block diagram of one embodiment of the control system.

As shown in FIG. 13, one embodiment of the power component 200 can include components such as one or more batteries 212, and a charger/adaptor component 204. In one embodiment, the batteries 212 can power both the vehicle and the articulator. In one embodiment, the batteries 212 can allow a 36-volt DC operation of the articulator. In one embodiment, the batteries 212 can be charged via the charging component 204. In one embodiment, the charging component 204 can also provide a functionality of a power adaptor, so that the articulator 102 can be operated by power from an external source while the batteries are being charged.

In one embodiment, various articulators that can be mounted on the vehicle, and operated therefrom, can include manually-operated arms, power-operated arms, or any combinations thereof. Also, such vehicle mountable articulators can be used for, but not limited to, coordinate measuring devices, scanning devices, and the like.

Figure 14:
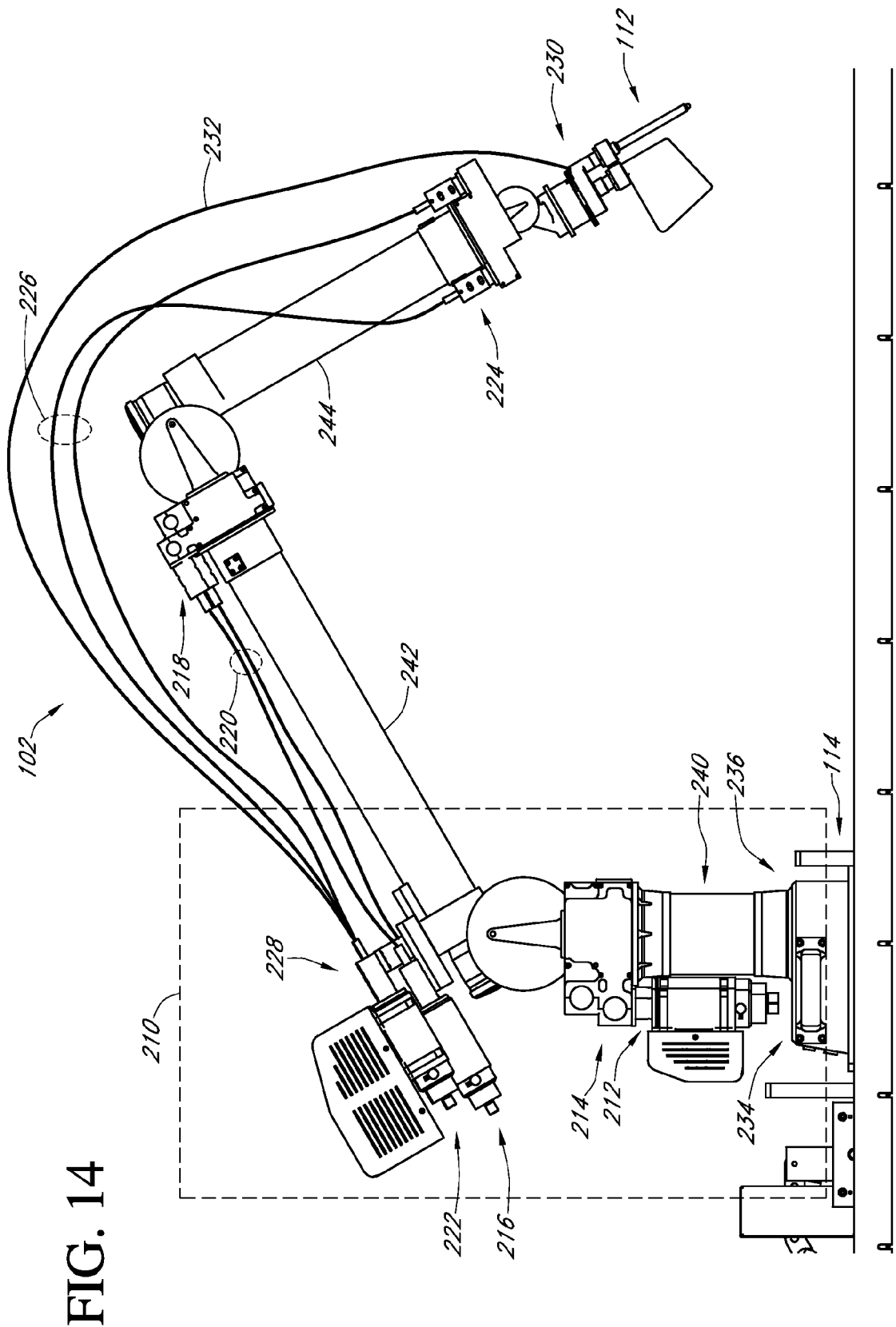
FIG. 14 shows one embodiment of an actuator system that allows various movements of the articulator.

FIG. 14 shows one example embodiment of the articulator 102 configured for powered operation. The example articulator 102 is also shown to have relatively heavier components positioned close to the base 114 so as to reduce the moment of inertia of the articulator (with respect to the mounting location on the base 114). Such reduction in moment of inertia can increase the rate of various motions of the articulator 102, as well as the general stability of the articulator 102.

The relatively heavier components can include various servo drive motors. In the example articulator 102, these motor assemblies are depicted as 234, 212, 216, 222, and 228. The example motor assembly 234 is shown to be coupled to a movement mechanism 236 that facilitates rotation of a first arm section 240 with respect to the base 114. The example motor assembly 212 is shown to be coupled to a movement mechanism 214 that facilitates rotation of a second arm section 242 with respect to the first section 240. In one embodiment, the motor assemblies 234 and 212 are directly coupled to their respective movement mechanisms 236 and 214, since these motor locations are relatively close to the base 114 of the articulator.

A movement mechanism 218 that facilitates rotation of a third arm section 244 with respect to the second arm section 242 is shown to be located relatively far from the base 114. Hence in one embodiment, the example motor assembly 216 is shown to be positioned at the proximal end of the second arm section 242 to drive the movement mechanism 218 positioned at the distal end of the second arm section 242. In one embodiment, flexible drive cables 220 provide the coupling between the motor assembly 216 and the movement mechanism 218.

Similarly, a movement mechanism 224 that facilitates motion of the end assembly 112 relative to the third arm 244 is shown to be located relatively far from the base 114. Hence in one embodiment, the example motor assembly 222 is shown to be positioned at the proximal end of the second arm section 242 to drive the movement mechanism 224 positioned at the distal end of the third arm section 244. In one embodiment, flexible drive cables 226 provide the coupling between the motor assembly 222 and the movement mechanism 224. Similar coupling can be provided between a movement mechanism 230 for the end assembly 112 and the example motor assembly 228 (hidden from view) that is located at the proximal end of the second arm section 242.

Thus, one can see that the relatively heavy components (such as servo drive motors) can be positioned in a volume 210 that is generally above the mounting location at the base 114. Such positioning of the relatively heavy components can provide greater stability of the articulator 102 during operation or during transport (since the mounting at the base is likely more robust than the latching mechanism that secures the end assembly).

Figure 15:
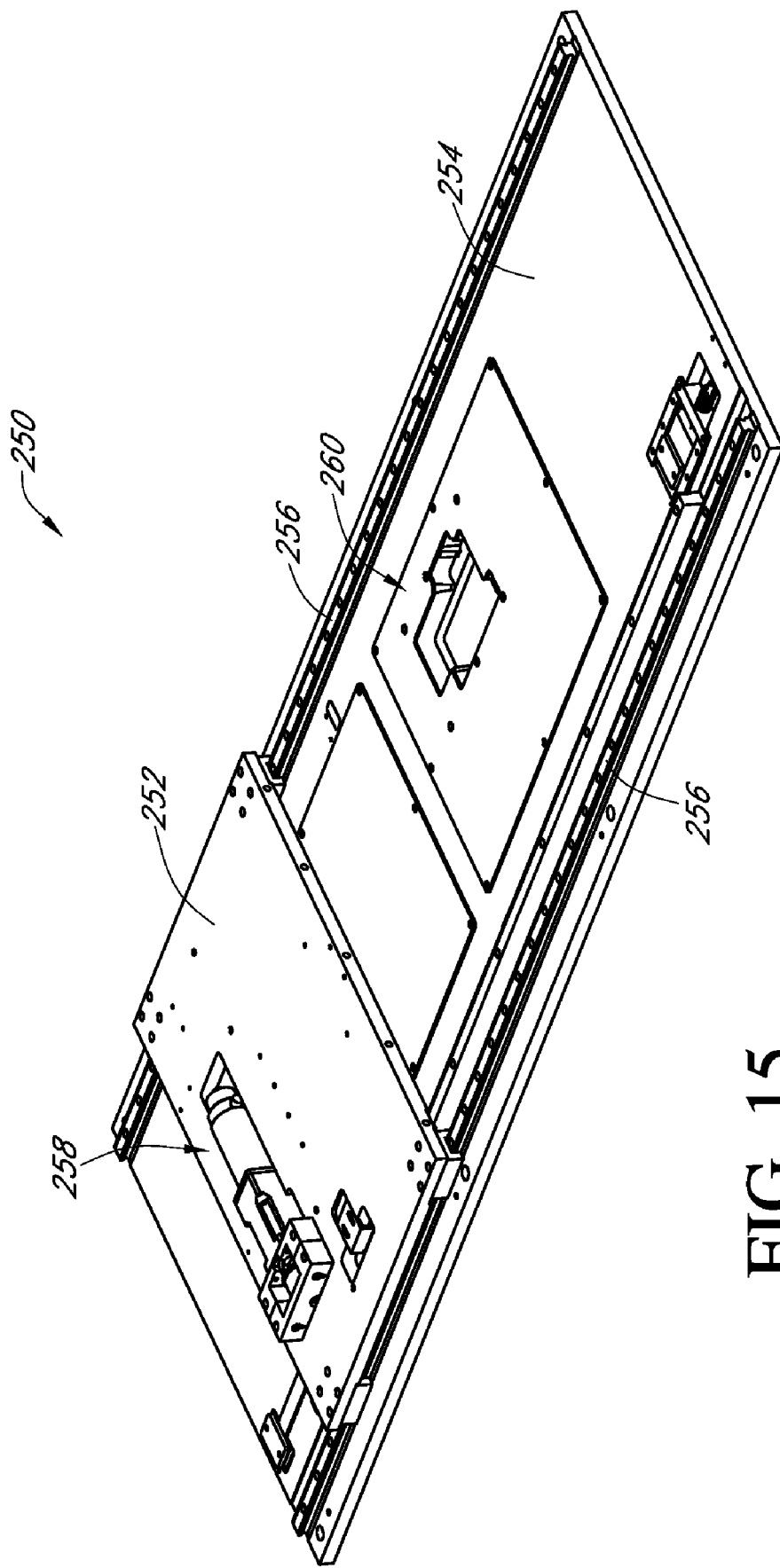
FIG. 15 shows an isolated view of one embodiment of a slidable platform assembly that facilitates a sliding motion of the articulator.

FIGS. 15-16 show one embodiment of an example platform assembly configured to provide a sliding linear motion of the base of the articulator relative to the vehicle, and also to provide the receiving space for the end assembly of the articulator.

FIG. 15 shows an isolated view of one embodiment of a platform assembly 250 having a movable mounting plate 252 to which the base of the articulator can be mounted. The mounting plate 252 is also shown to host a servo drive motor 258 that drives the linear motion of the mounting plate 252 relative to a top plate 254 of the vehicle. In the shown example embodiment, the linear motion is guided by a pair of rails 256, and effectuated by a mechanism such as a belt-driven or a gear-and-rack system.

Figure 16A:
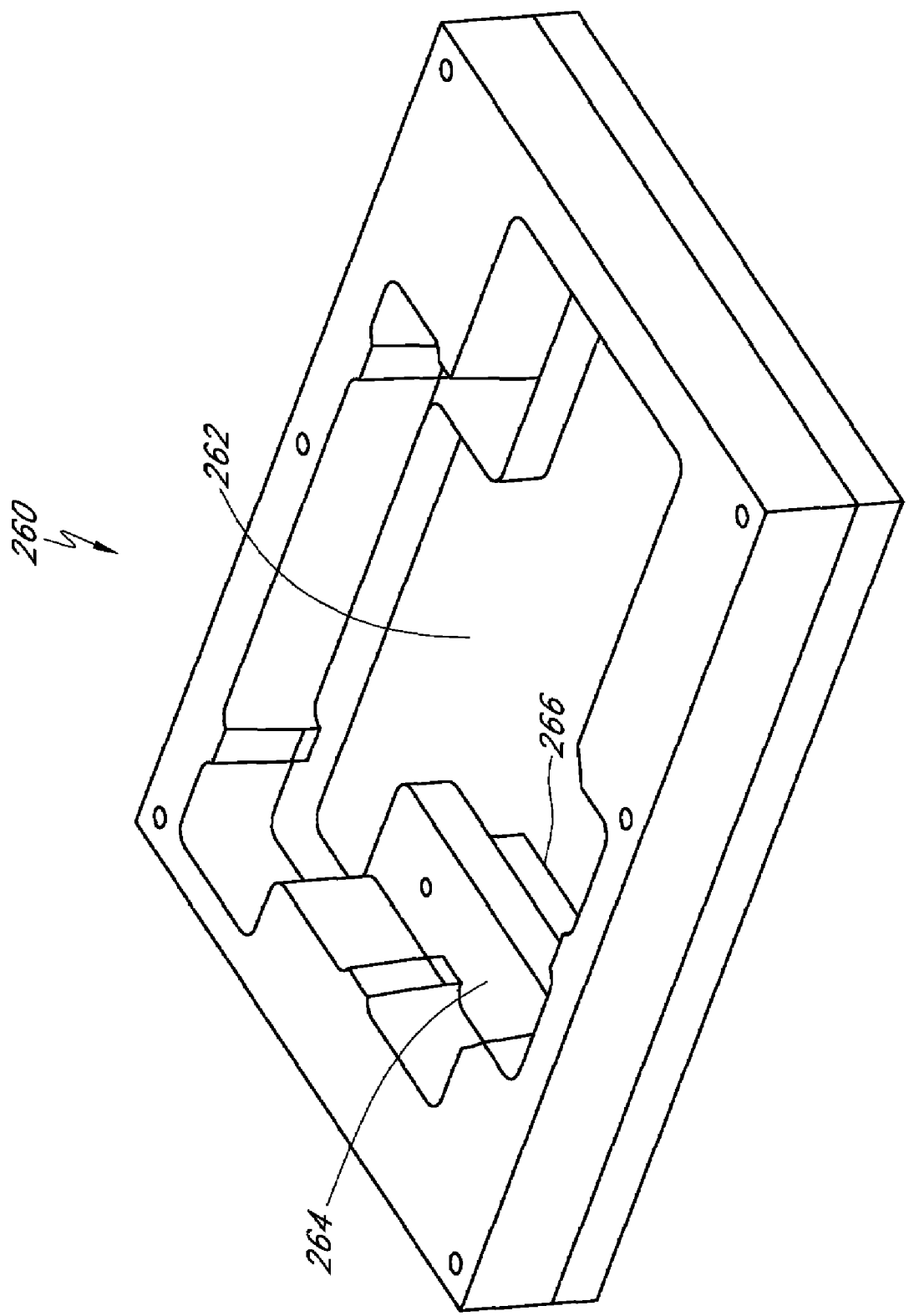
FIG. 16A and 16B show isolated top and bottom views of one embodiment of a nest assembly that is configured to receive and secure the end assembly of the articulator.
Figure 16B:
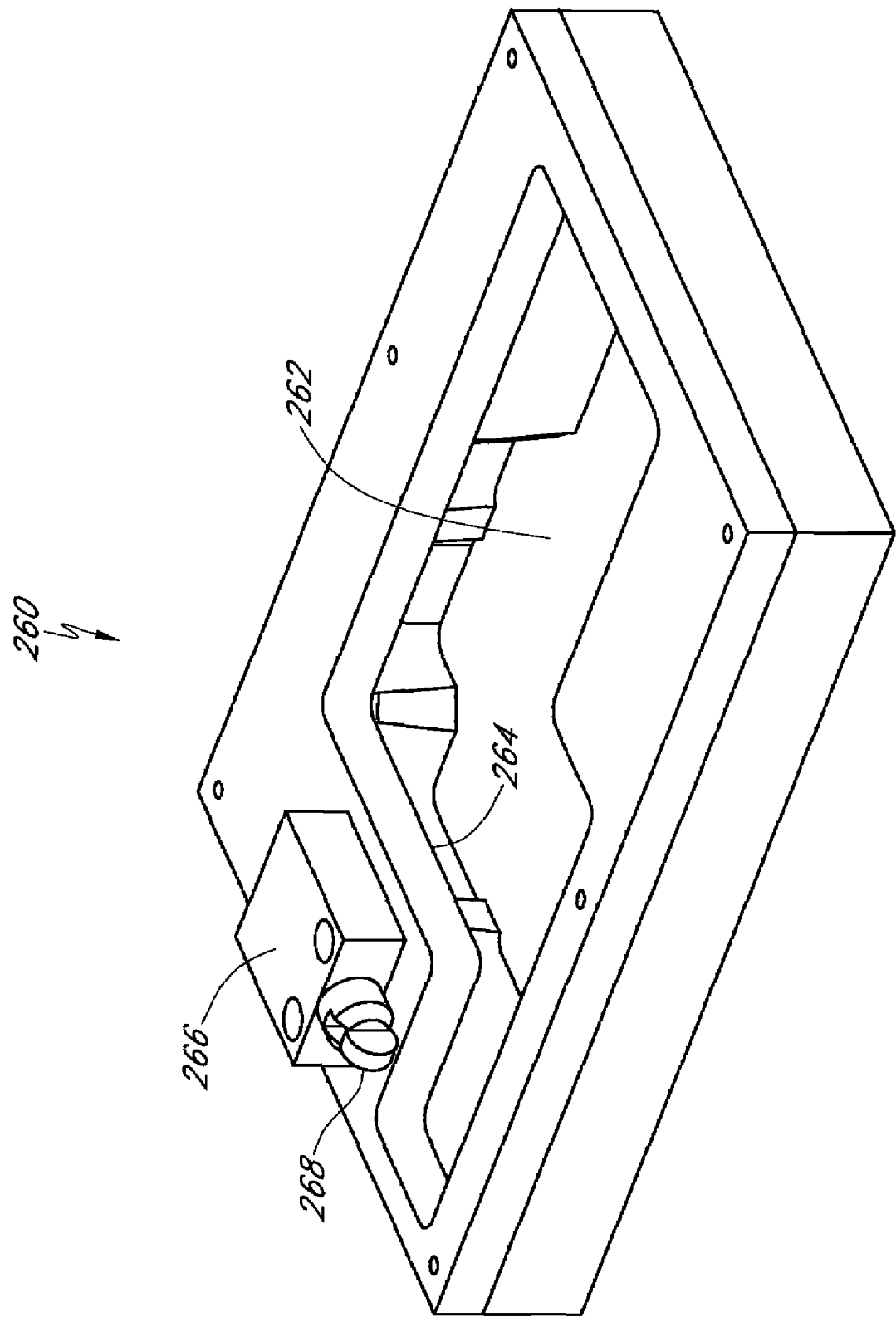

As further shown in FIG. 15, the top plate 254 is shown to host a nest 260 that is configured to receive and secure the end assembly of the articulator. FIGS. 16A and 16B show isolated top and bottom perspective views of the nest assembly 260.

As shown in FIGS. 16A and 16B, one embodiment of the nest assembly 260 includes and opening 262 through which the end assembly of the articulator enters or exits. The nest assembly 260 is also shown to include a resting plate 264 on which the end assembly rests on when secured. The nest assembly 260 is also shown to include a latching mechanism 266 configured to secure the end assembly within the nest assembly. As shown in FIG. 16B, the latching mechanism 266 can be a bolt-type device 268 that can be actuated either manually or by some powered mechanism. As described previously, the latching mechanism 266 can also be incorporated into the interlock system so that releasing of the end assembly is inhibited under certain conditions.

As also described previously, the example nest assembly 260 defines the opening 262 dimensioned to allow insertion and retraction of the end assembly in a safe manner. The nest assembly 260 may or may not include walls under the opening 262.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the claims, where claim language carries an ordinary meaning as in customary usage and not by special definition unless specifically stated as providing a definition.

What is claimed is:

1. A vehicle, comprising:
a movement mechanism configured to facilitate movement of said vehicle;
a body coupled to said movement mechanism;
an articulator coupled to said body so as to allow operation of said articulator from said vehicle;
a coordinate measuring machine coupled to an end of the articulator; and a plurality of retractable stabilizers, configured to provide a sufficiently rigid and stable coupling with a surface;
wherein said articulator is coupled to said body via a platform, said articulator being mounted to said platform and said platform being coupled to said body and
wherein the vehicle further comprises a platform movement mechanism configured to allow movement of said platform with respect to said body to increase the range of motion of said articulator during its operation.

2. The vehicle of claim 1, further comprising a substantially self-contained drive system that allows a human operator to drive said vehicle to different locations.

3. The vehicle of claim 2, wherein said drive system comprises an electrical motor that is powered by one or more on-board batteries.

4. The vehicle of claim 3, wherein said one or more on-board batteries also power operation of said articulator.

5. The vehicle of claim 2, wherein said vehicle includes a plurality of wheels to facilitate said movement, at least one of said plurality of wheels being steerable by said operator.

6. The vehicle of claim 1, wherein the stabilizers form a metal-to-metal coupling with the surface when extended.

7. The vehicle of claim 1, wherein said platform is movable in a rotational manner with respect to said body.

8. The vehicle of claim 1, wherein said platform is movable in a translational manner.

9. The vehicle of claim 8, wherein said platform movement mechanism comprises a mounting plate coupled to one or more rails that provide guidance for a substantially linear motion of said mounting plate relative to said body, said mounting plate configured to allow mounting of said articulator thereon.

10. The vehicle of claim 8, wherein said translational motion comprises a motion of said platform along a longitudinal direction defined by front and rear of said vehicle.

11. The vehicle of claim 8, wherein said translational motion comprises a motion of said platform along a direction having a vertical component.

12. The vehicle of claim 1, wherein said articulator includes a distal end for mounting of an end assembly.

13. The vehicle of claim 12, wherein said body defines an opening that receives at least a portion of said end assembly to provide protection for said end assembly.

14. The vehicle of claim 13, wherein said opening is dimensioned so as to allow substantially all of said end assembly to be within a volume defined by said body.

15. The vehicle of claim 13, further comprising a latching mechanism that secures said distal end or said end assembly to said body when said articulator is not in use or when said vehicle is in motion.

16. The vehicle of claim 1, further comprising an interlock system that inhibits or restricts operation of said articulator under one or more selected conditions.

17. The vehicle of claim 16, wherein said interlock system disables movement of said vehicle when said articulator is in its deployed configuration.

18. The vehicle of claim 16, wherein said interlock system allows only a limited movement of said articulator transitions between its deployed configuration and secured configuration.

19. The vehicle of claim 18, wherein said limited movement comprises limited speed and direction of said movement to reduce the likelihood of damage to said articulator during transition between said deployed and secured configurations.

20. The vehicle of claim 16, further comprising an override mechanism that allows overriding of at least one of inhibiting or restricting functionality of said interlock system.

21. The vehicle of claim 1, wherein said articulator comprises a plurality of arm sections, with movement of each arm section being effectuated by drive cables driven by motors that are positioned proximately to the location where said articulator is mounted to said body, thereby reducing the moment of inertia of said articulator about said mounting location.

22. A method for operating articulators, comprising:
providing a movement mechanism to a vehicle so as to facilitate movement of said vehicle;
mounting an articulator on said vehicle such that said articulator can be operated at different locations reachable by movements of said vehicle;
mounting a coordinate measuring machine on said articulator such that the machine can precisely measure position at a variety of coordinates; and
mounting a plurality of retractable stabilizers to the vehicle configured to provide a sufficiently rigid and stable coupling with a surface;
wherein said mounting of said articulator to said vehicle comprises mounting said articulator to a platform that is movable relative to said vehicle and wherein said platform is movable in a translational manner.

23. The method of claim 22, wherein said movement mechanism comprises a substantially self-contained drive system that allows a human operator to drive said vehicle to different locations.

24. The method of claim 22, wherein the stabilizers form a metal-to-metal coupling with the surface when extended.

25. The method of claim 22, wherein said mounting of said articulator to said vehicle comprises mounting said articulator to a platform that is movable relative to said vehicle.

26. The method of claim 25, wherein said platform is movable in a translational manner.

27. The method of claim 26, wherein said translational motion comprises a motion of said platform along a direction having a vertical component.

28. The method of claim 25, wherein said platform is movable in a rotational manner with respect to said body.

29. The method of claim 26, wherein said translational motion comprises a motion of said platform along a longitudinal direction defined by front and rear of said vehicle.

30. The method of claim 22, further comprising providing a securing assembly that secures said articulator at or near its distal end to reduce likelihood of damage to said articulator during motion of said vehicle.

31. The method of claim 22, further comprising providing an interlock system that inhibits or restricts operation of said articulator under one or more selected conditions.

32. The method of claim 31, wherein said interlock system disables movement of said vehicle when said articulator is in its deployed configuration.

33. The method of claim 31, wherein said interlock system allows only a limited movement of said articulator transitions between its deployed configuration and secured configuration.

34. The method of claim 33, wherein said limited movement comprises limited speed and direction of said movement to reduce the likelihood of damage to said articulator during transition between said deployed and secured configurations.

35. The method of claim 31, further comprising providing an override mechanism that allows overriding of at least one of inhibiting or restricting functionality of said interlock system.

* * * * *